(12) United States Patent
Chen et al.

(10) Patent No.: US 12,369,592 B2
(45) Date of Patent: Jul. 29, 2025

(54) OPTICAL COMMUNICATION SYSTEM FOR POSITION-FINDING OF A PORTABLE ELECTRONIC DEVICE IN FREE SPACE

(71) Applicant: Apple Inc., Cupertino, CA (US)

(72) Inventors: Tong Chen, Fremont, CA (US); Mark T. Winkler, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 97 days.

(21) Appl. No.: 18/139,835

(22) Filed: Apr. 26, 2023

(65) Prior Publication Data

US 2023/0255214 A1     Aug. 17, 2023

Related U.S. Application Data

(63) Continuation of application No. 16/554,450, filed on Aug. 28, 2019, now Pat. No. 11,639,998.

(60) Provisional application No. 62/738,811, filed on Sep. 28, 2018.

(51) Int. Cl.
| | | |
|---|---|---|
| G01S 17/48 | (2006.01) | |
| A21B 3/13 | (2006.01) | |
| A21D 13/20 | (2017.01) | |
| A21D 13/31 | (2017.01) | |
| A21D 13/60 | (2017.01) | |
| A21D 13/80 | (2017.01) | |
| A47J 37/12 | (2006.01) | |
| G01B 11/00 | (2006.01) | |
| G01B 11/26 | (2006.01) | |
| G01S 3/782 | (2006.01) | |

(52) U.S. Cl.
CPC ............... *A21B 3/13* (2013.01); *A21D 13/20* (2017.01); *A21D 13/31* (2017.01); *A21D 13/60* (2017.01); *A21D 13/80* (2017.01); *A47J 37/1295* (2013.01); *G01S 17/48* (2013.01); *A23G 2220/12* (2013.01); *A23V 2002/00* (2013.01)

(58) Field of Classification Search
None
See application file for complete search history.

(56) References Cited

U.S. PATENT DOCUMENTS

| | | |
|---|---|---|
| 5,808,760 A | 9/1998 | Gfeller |
| 7,609,972 B2 | 10/2009 | Cunningham |
| 7,715,723 B2 | 5/2010 | Kagawa et al. |
| 7,830,575 B2 | 11/2010 | Moon et al. |

(Continued)

FOREIGN PATENT DOCUMENTS

| | | |
|---|---|---|
| CN | 103986502 | 8/2014 |
| CN | 105122687 | 12/2015 |

(Continued)

*Primary Examiner* — Christopher Braniff
(74) *Attorney, Agent, or Firm* — Brownstein Hyatt Farber Schreck, LLP

(57) ABSTRACT

A optical communication system including a source device and an endpoint device. The source device include an array of laser diodes and is configured to drive the laser diodes to project a sequence of patterns into the field of view of the source device to define a set of serially-projected codes, each of which isolated to one respective angular division of the field of view of the source device. The endpoint device receives a serially-projected code from the source device which varies based which angular division of the field of view of the source device is occupied by the endpoint device.

19 Claims, 20 Drawing Sheets

(56) References Cited

U.S. PATENT DOCUMENTS

| | | |
|---|---|---|
| 8,251,517 B2 | 8/2012 | Gibson et al. |
| 8,391,719 B2 | 3/2013 | Alameh |
| 8,531,650 B2 | 9/2013 | Feldkhun et al. |
| 8,588,805 B2 | 11/2013 | Besoll et al. |
| 9,195,038 B2 | 11/2015 | Aiko |
| 9,485,745 B2 | 11/2016 | Kurby et al. |
| 9,489,670 B2 | 11/2016 | McGill |
| 9,594,152 B2 | 3/2017 | Ryan et al. |
| 9,742,492 B2 | 8/2017 | Shatz et al. |
| 9,825,425 B2 | 11/2017 | Mor |
| 10,043,282 B2 | 8/2018 | Smits |
| 10,148,056 B2 | 12/2018 | Uyeno et al. |
| 10,523,318 B2 | 12/2019 | Chen et al. |
| 10,534,074 B2 | 1/2020 | Slobodyanyuk et al. |
| 2011/0052195 A1 | 3/2011 | Karstens |
| 2015/0172878 A1 | 6/2015 | Luna |
| 2015/0270900 A1 | 9/2015 | Hilario et al. |
| 2017/0244490 A1 | 8/2017 | Hallal et al. |
| 2017/0374244 A1 | 12/2017 | Swaminathan et al. |
| 2019/0034043 A1 | 1/2019 | Zolotykh et al. |
| 2019/0249984 A1* | 8/2019 | Barlev ............... G06T 7/55 |
| 2020/0057147 A1 | 2/2020 | Chen et al. |
| 2020/0064642 A1* | 2/2020 | Du ............... G02B 27/0944 |
| 2020/0103527 A1 | 4/2020 | Chen et al. |
| 2021/0026013 A1 | 1/2021 | Beuschel et al. |

FOREIGN PATENT DOCUMENTS

| | | |
|---|---|---|
| DE | 102017125686 | 5/2019 |
| WO | WO 17/200948 | 11/2017 |

\* cited by examiner

OPTICAL COMMUNICATION SYSTEM FOR POSITION-FINDING OF A PORTABLE ELECTRONIC DEVICE IN FREE SPACE

CROSS-REFERENCE TO RELATED APPLICATIONS

This application is a continuation of U.S. patent application Ser. No. 16/554,450, filed Aug. 28, 2019, which is a nonprovisional and claims the benefit under 35 U.S.C. 119(e) of U.S. Provisional Patent Application No. 62/738,811, filed Sep. 28, 2018, the contents of which are incorporated by reference as if fully disclosed herein.

FIELD

Embodiments described herein relate to position-finding systems for portable electronic devices and, in particular, to systems configured to facilitate determination of a spatial and/or angular position of a portable electronic device relative to a reference point in free space.

BACKGROUND

An electronic device can include a system—referred to herein as a "positioning system"—to determine a spatial position and/or an angular orientation of that electronic device in free space relative to a reference point, such as another electronic device.

However, many conventional positioning systems are required to rapidly perform computationally-complex calculations, to determine phase difference between two or more high-speed signals with exceptional accuracy, and/or to include sophisticated circuitry or structure. As such, conventional positioning systems are often prohibitively complex and/or power-consuming and may not be efficiently or readily incorporated into battery-powered consumer electronic devices.

SUMMARY

Embodiments described generally reference an apparatus (also referred to as a "source device") for projecting angular-encoded information into its field of view. The apparatus includes, in many examples, an array of laser diodes coupled to, or otherwise formed into or onto, a substrate. The apparatus also includes a drive circuit coupled to each laser diode of the array of laser diodes and configured to drive the laser diodes to project a sequence of patterns into the field of view, the sequence of patterns defining a set of serially-projected codes, each of which is spatially isolated to one respective angular division of the field of view.

Embodiments described herein also reference a method of operating an apparatus (source device) to project angular-encoded information into its field of view. The method includes the operation of: projecting a sequence of patterns into the field of view to define a set of serially-projected codes, each serially-projected code isolated to one respective angular division of the field of view of the apparatus.

Embodiments described herein generally reference method of operating an apparatus (also referred to as an "endpoint device") to receive angular-encoded information via optical communication. The method includes the operations of receiving a serially-projected code at a photosensitive element of the apparatus and correlating the serially-projected code to an angle using a lookup table, wherein the angle corresponds to an angular offset between the apparatus and a source device that projected the serially-projected code.

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

The use of the same or similar reference numerals in different figures indicates similar, related, or identical items.

Figure 1A:
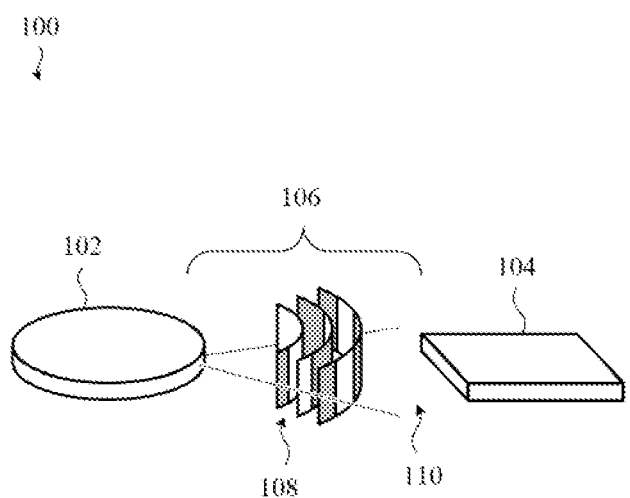
FIG. 1A depicts an optical communication system, including a source device and two endpoint devices, such as described herein.

The use of cross-hatching or shading in the accompanying figures is generally provided to clarify the boundaries between adjacent elements and to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Similarly, certain accompanying figures include vectors, rays, traces and/or other visual representations of one or more example paths—which may include reflections, refractions, diffractions, and so on, through one or more mediums—that may be taken by one or more photons originating from one or more light sources shown or, or in some cases, omitted from, the accompanying figures. It is understood that these simplified visual representations of light are provided merely to facilitate an understanding of the various embodiments described herein and, accordingly, may not necessarily be presented or illustrated to scale or with angular precision or accuracy, and, as such, are not intended to indicate any preference or requirement for an illustrated embodiment to receive, emit, reflect, refract, focus, and/or diffract light at any particular illustrated angle, orientation, polarization, color, or direction, to the exclusion of other embodiments described or referenced herein.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Embodiments described herein reference a system including two (or more) electronic devices, separated from one another in free space, and configured for optical communication that facilitates computationally-efficient position-finding of one or both of the electronic devices, relative to one another, including a relative orientation and/or a relative distance separating the electronic devices.

In these embodiments, one of the electronic devices, referred to herein as the "source device," includes a projection subsystem typically implemented with one or more arrays of laser diodes and, optionally, with one or more optical adapters or structures (e.g., microlens, macrolens, reflectors, condensers, collimators, narrow field of view filters, polarizers, and so on). In some embodiments, the arrays of laser diodes are positioned behind a controllable shutter, such as a liquid crystal filter.

As a result of these and other described and equivalent constructions and arrangements, the projection subsystem of a source device, such as described herein, can be configured to project one or more patterns or images (typically not substantially focused to any particular focal plane) to illuminate a conical or pyramidal field of view diverging according to a selected divergence angle from the source device into free space.

In typical embodiments, the projection subsystem includes a sequence controller that is configured to project a sequence of patterns that diverge at a selected divergence angle into the field of view of the source device. Each pattern of a sequence is evenly divided into the same set of parallel segments, which are typically oriented relative to an axis of the source device, such as a horizontal axis or a vertical axis. In this manner, each segment corresponds to one angular division of the field of view of the projection subsystem. Phrased in another, non-limiting manner, each segment illuminates only one angular division of the field of view of the projection subsystem. For convenient reference, in some embodiments, the parallel segments, along with the corresponding angular divisions of the field of view, can be indexed according to an indexing schema.

As may be appreciated, as a result of these other described and equivalent techniques, each indexed segment of each pattern may be selectively illuminated (e.g., with selected brightness, color, spectral content, phase, frequency, polarization, modulation, and so on) or not illuminated when the associated pattern is projected by the projection subsystem. In this manner, each indexed angular division of the field of view of the source device is selectively illuminated or not illuminated according to the pattern projected by the projection subsystem.

As a result, as specific patterns are projected in sequence over time and/or at a particular rate by the sequence controller of the projection subsystem of the source device into its field of view, each angular division of the field of view is effectively lit according to a serially-projected unique binary (or n-ary) code that is isolated to that angular division of the field view. In this manner, an observer positioned with a specific angular division of the field of view of the source device detects a unique pattern of light projected from the source device. In typical examples, the binary (or n-ary) code corresponds to a digital representation of data corresponding to an angle, relative to an axis of the source device, that in turn corresponds to the associated angular division of the field of view lit with that code. For simplicity of description, the binary (or n-ary) code associated with, and unique to, a particular angular division of a field of view of a source device is referred to herein as a "serially-projected code" and/or "angular-encoded data."

For example, in one embodiment, a source device has a horizontal field of view spanning one hundred and twenty degrees centered along a longitudinal axis of the source device. In this example, the projection subsystem of the source device can be configured to project five discrete patterns, in order, and at a selected or particular rate, into the field of view. In this example, each pattern can be segmented into thirty-two vertically-oriented segments and each segment can be associated with one respective four-degree division of the one-hundred-twenty degree field of view of the source device, identified by indexes 0 to 31.

In this example, each indexed angular division of the field of view can be lit with a different five-bit serially-projected code, each bit corresponding to one segment of one of the five patterns projected by the projection subsystem. For example, the four-degree division of the field of view associated with the angles between 0 degrees and 4 degrees (in this example, −56 degrees to −60 degrees offset from the longitudinal axis of the source device), indexed with index 0, may be lit according to a first binary pattern [0,0,0,0,1]. Similarly, the four-degree division of the field of view associated with angles between 4 degrees and 8 degrees (in this example, −52 degrees to −56 degrees offset from the longitudinal axis of the source device), may be lit according to a second binary pattern [0,0,0,1,0]. In this manner, an observer positioned −58 degrees horizontally offset from the longitudinal axis of the source device detects the first binary pattern of light, whereas an observer positioned −54 degrees horizontally offset from the longitudinal axis of the source device detects the second binary pattern of light. In this manner, as the observer moves relative to the horizontal axis of the source device, the observer detects a different binary pattern of light projected by the source device. The observer can correlate the received binary patterns of light to angles relative to the horizontal axis of the source device (e.g., using a lookup table, formula, database, or other suitable data structure) and, in this manner, can quickly and accurately—to a resolution of approximately four degrees—determine its own angular position in free space relative to the source device without substantial computational effort and without communication or coordination with the source device. Further, it may be appreciated that, in this example, an arbitrary number of observers can simultaneously determine angular position in free space relative to the source device without reducing the efficiency or speed with which the source device projects the sequence of patterns because neither communication nor coordination between the source device and an observer is required.

It may be appreciated that the encoding or modulation schema by which the sequence controller of the projection subsystem distinguishes bits and any associated complement(s) of a serially-projected code associated with a particular angular division of the field of view of the source device, such as described herein, can vary from embodiment to embodiment. Example schemas include, but are not limited to: a binary encoding schema in which an asserted bit is associated with illumination and its complement is associated with an absence of illumination; a binary encoding schema in which an asserted bit is associated with a first optical property (e.g., color, brightness, polarization, and so on) and its complement is associated with a second optical property; a ternary encoding schema in which a first bit is associated with a first optical property, a second bit is associated with a second optical property, and a third bit is associated with a third optical property (or an absence of illumination); and so on.

In addition, as noted above, the system of the preceding example embodiment also typically includes a second electronic device, an observer, referred to herein as an "endpoint device." An endpoint device, such as described herein, includes one or more photosensitive elements configured to detect changes in light projected from the source device.

As a result of the technique(s) described above, it may be appreciated that the light and, correspondingly, the serially-projected code, received by the endpoint device depends upon the relative angular position of the source device and the endpoint device. In other words, as the endpoint device and the source device are moved relative to one another, the serially-projected code received by the endpoint device changes.

In further embodiments, an endpoint device, such as described herein, includes more than one photosensitive element separated by a known distance and/or distributed in a plane in a known pattern or constellation. For example, an endpoint device can include two collinear photosensitive elements separated by a known distance d. In this example, each photosensitive element of the endpoint device may detect a different serially-projected code, associated with a different angular division of the field of view of a source device projecting angular-encoded data toward the endpoint device. In this manner, the endpoint device can use known distance separating the photosensitive elements and the angular position of each photosensitive element to triangulate, trilaterate, or otherwise determine a spatial position of the endpoint device relative to the source device.

In still further embodiments, a source device, such as described herein, can be configured to project multiple sequences of patterns, either simultaneously or in sequence. In these examples, each sequence of patterns can be oriented relative to a different axis of the source device. For example, in one embodiment, a source device can project a first sequence of patterns oriented relative to a horizontal axis of the source device and a second sequence of patterns oriented relative to a vertical axis of the source. The first sequence of patterns can be projected before or after the sequence of patterns. In other cases, the first and second sequences of patterns can be projected simultaneously in a manner such that the patterns do not interfere with one another (e.g., each pattern simultaneously projected according to a different polarization or color of light). In this manner, an endpoint device can detect and determine both its azimuthal angle and its polar angle relative to the source device.

Phrased in another, non-limiting, matter, embodiments described herein reference an electronic device (e.g., a source device) configured to transmit, via serial optical communication, digital data corresponding to its own angular position in free space relative to any other electronic device (e.g., an observer or an endpoint device, such as described herein) that may receive that optical communication. More simply, a source device, such as described herein, is configured to transmit angularly-encoded information into its field of view. An observer (e.g., an endpoint device) within that field of view detects a serially-projected code that varies based on the observer's position and angle relative to the source device.

Phrased in yet another, more general, and non-limiting manner, embodiments described herein reference an optical communication system configured to transmit and receive angularly-encoded information. As a result of these described and equivalent constructions and architectures, various portable or stationary electronic devices can determine relative spatial position and/or an angular orientation information, with respect to one another, without requiring substantial computational work, two-way communication, or other communication or coordination between the various devices.

The phrase "optical communication," as used herein, generally and broadly, refers to transmitting, broadcasting, or otherwise conveying digital and/or analog information or data from at least one source device to at least one endpoint device by selectively modulating and/or otherwise controlling the amplitude, frequency, phase, polarization, angle, pulse width, duty cycle, color, spectral content, and/or any other suitable characteristic of visible or traditionally non-visible light propagating through a medium (e.g., gases, liquids, vacuum, and so on) that physically separates the source device(s) from the endpoint device(s).

It may be appreciated that any stationary or portable electronic device can be either (or both) a source device or an endpoint device of an optical communication system, such as described herein. Example electronic devices include, but are not limited to: mobile phone devices; tablet devices; laptop devices; desktop computers; computing accessories; peripheral input devices; home or business networking devices; aerial, marine, submarine, or terrestrial vehicle control devices or networking devices; mobile entertainment devices; augmented reality devices; virtual reality devices; industrial control devices; digital wallet devices; home or business security devices; wearable devices; head-mounted devices; hand-held controllers; health or medical devices; implantable devices; clothing-embedded devices; fashion accessory devices; home or industrial appliances; media appliances; and so on.

In many embodiments, an optical communication system, such as described herein, is unidirectional in that light is projected from the source device independent of any communication or interaction with an endpoint device. In other cases and embodiments, an optical communication system can include two-way communication by and between source device(s) and endpoint device(s), however, for simplicity of description and illustration, the embodiments that follow reference an optical communication system in which a source device projects angularly-encoded information into its field of view independent of any required interaction with an endpoint device within that field of view.

As noted above, an optical communication system, such as described herein, includes at least a source device and an endpoint device. The source device includes a projection subsystem and the endpoint device includes at least one photosensitive element.

In these examples, the projection subsystem of the source device can include any suitable electrical or electronic light source or combination of light sources, including both multipart and solid-state light sources. In many embodiments, a light source of a projection subsystem in a source device is a semiconductor light source such as, but not limited to: a vertical-cavity surface-emitting laser ("VCSEL"); a vertical external-cavity surface-emitting laser; a light-emitting diode; an organic light-emitting diode; a resonant-cavity light-emitting diode; a micro-scale light-emitting diode; a superluminescent light-emitting diode; a broad-area laser diode; a diode-pumped laser; a mode-locked diode laser; an infrared band laser; an ultraviolet band laser; and so on.

In some embodiments, the projection subsystem of a source device can be optically coupled to one or more passive or active optical structures that direct, collimate, focus, and/or diverge light emitted from the light source in a particular direction or manner to define a field of view for the source device. Example optical structures can include, but may not be limited to: optical adapters; waveguides; optical fibers; reflectors; lenses; microlenses; beamforming and/or beam-directing lenses or lens structures; beam splitters; beam collimators; polarizers; movable lenses; color filters; cut filters; beam expanders; beam divergers; planar light wave circuits; liquid crystal shutters or other intermediate image planes; and so on.

The photosensitive element of an endpoint device, such as described herein, can be any suitable photosensitive element or combination of elements, including both multipart and solid-state photosensitive elements operated in either photovoltaic mode (e.g., not reverse biased) or photoconductive mode (e.g., reverse biased). Example photosensitive elements include, but are not limited to: semiconductor photodiodes; semiconductor photodetectors; avalanche diodes; charge-coupled devices; and so on.

Further, it may be appreciated that the size and shape of a photosensitive element can vary from embodiment to embodiment. In some cases, a "photosensitive area" of a photosensitive element can take a circular shape, whereas in other cases, the photosensitive area can take another shape (e.g., square, rectangular, octagonal, irregular, polygonal, and so on). It may be further appreciated that different semiconductor materials (e.g., silicon, germanium, indium-gallium arsenide, gallium phosphide, and so on) may exhibit different electrical properties (e.g., responsivity, rise time, fall time, dark current, and so on) in response to stimulation by different spectral ranges and/or amplitudes of light. Similarly, different photosensitive area geometries and/or dimensions may result in different electrical properties. For example, smaller photosensitive areas may be associated with faster rise times and faster fall times.

As with the light source of the source device, in some embodiments, the photosensitive element of an endpoint device can be optically coupled to one or more passive or active optical structures that redirect and/or focus light onto the photosensitive area of the photosensitive element. Example optical structures can include, but may not be limited to: optical adapters; optical fibers; reflectors; lenses; microlenses; beamforming and/or beam-directing lenses or lens structures; beam collimators; polarizers; movable lenses; color filters; cut filters; beam concentrators; planar light wave circuits; and so on.

For simplicity of description, the embodiments that follow reference a source device including a projection subsystem with at least one array of VCSEL light sources (hereinafter, an array of "lasers" or "laser diodes") that each emit light in a spectral range including a traditionally non-visible frequency band (e.g., infrared light). Further, although not required for all embodiments, the example VCSEL light sources described in reference to many embodiments that follow are presumed to be Class 1 lasers as defined by the American National Standards Association.

Similarly, for simplicity of description, the embodiments that follow reference an endpoint device including at least one semiconductor photodiode (hereinafter, a "photodiode"). The photodiode has a generally small, circular photosensitive area (e.g., having a diameter of less than 100 m, such as 20-50 μm) and is operated in a photoconductive mode. The photosensitive area of this example photodiode is responsive to light in the spectral range emitted by the laser diode of the source device.

These foregoing and other embodiments are discussed below with reference to FIGS. 1A-18. However, those skilled in the art will readily appreciate that the detailed description given herein with respect to these figures is for explanatory purposes only and should not be construed as limiting.

FIG. 1A depicts an optical communication system 100 optically coupling two electronic devices, identified as the source device 102 and the endpoint device 104. As with other embodiments described herein, the source device 102 is configured to optically communicate angular-encoded data to the endpoint device 104 such that the endpoint device 104 can determine its angular and/or spatial position relative to the source device 102.

In the illustrated example, the source device 102 and the endpoint device 104 are separated by an air gap 106 (e.g., free space). In typical examples, the source device 102 and the endpoint device 104 are battery-operated portable electronic devices, that may be moved by a user relative to one another, but this may not be required; in some embodiments, one or both of the source device 102 and the endpoint device 104 are stationary.

For example, in one embodiment, the source device 102 is a stationary device and the endpoint device 104 is worn by a user. In one implementation, the source device 102 is positioned relative to an activity space associated with a virtual or augmented reality system about which a user can freely move. In this implementation, the user may wear the endpoint device 104, or a device including the endpoint device 104 (e.g., head-mounted device, wrist-worn device, chest-mounted device, and so on). As a result of this construction, the source device 102 can optically communicate angular-encoded data to the endpoint device 104.

As noted above, the source device 102 and the endpoint device 104 can be any suitable electronic devices; example electronic devices are non-exhaustively listed above. The source device 102 includes a housing enclosing, at least in part, a projection subsystem (not shown) that includes at least one laser diode. The endpoint device 104 includes a housing enclosing, at least in part, a photodiode.

In some cases, the projection subsystem—or a portion thereof, such as a lens—can extend at least partially through the housing of the source device 102, although this is not required. In some cases, a protective cover (e.g., lens window) can be provided in, or defined by, the housing of the source device 102. In these embodiments, the projection subsystem is positioned behind, and protected by, the protective cover.

As with other embodiments described herein, the projection subsystem of the source device 102 is configured to project a sequence of patterns 108—also referred to as frames—across the air gap 106 toward the endpoint device 104. In the illustrated example, the sequence of patterns 108 is depicted with three discrete patterns, projected in sequence, although it is appreciated that this is merely one example and that other patterns and sequences are possible in view of the embodiments, constructions, architectures, and techniques described herein.

The projection subsystem of the source device 102 can be configured to project the sequence of patterns 108 into the field of view 110 of the source device 102. In the illustrated embodiment, each pattern of the sequence of patterns 108 is evenly divided into parallel segments, oriented parallel to a vertical axis of the source device 102. In this manner, each segment of each pattern corresponds to one angular division of the field of view 110 of the source device 102. As described above, by selectively modifying the illumination characteristics of each segment of each pattern, a unique code can be projected into each angular division of the field of view 110. In this manner, the photodiode of the endpoint device 104 receives a different serially-projected code depending upon which angular division of the field of view 110 of the source device 102 the endpoint device 104 occupies at a particular time.

As noted above, the serially-projected codes or other angularly-encoded information communicated by the source device 102 to the endpoint device 104 can be encoded, encrypted, or otherwise transmitted, emitted, or projected according to any suitable schema (e.g., code division; time division; quadrature modulation; phase shift keying; frequency-shift keying; amplitude-shift keying; pulse code modulation; variable brightness; variable frequency; variable color; and so on).

For example, in one embodiment, the projection subsystem of the source device 102 is configured to project the color red in one vertical segment of the first frame of the sequence of patterns 108, to project the color green in the same vertical segment of the second frame of the sequence of patterns 108, and to project the color red in the same vertical segment of the third frame of the sequence of patterns 108. If the endpoint device 104 is positioned within the angular division of the field of view 110 associated with that vertical segment, then the photodiode of the endpoint device 104 will observe the source device 102 emitting the color sequence red-green-red. Thereafter, the endpoint device 104 can access a database, such as a look-up table, to associate the color sequence red-green-red with a particular digital data value, such as an angle, relative to an axis of the source device 102, from which the red-green-red sequence was broadcast. In other examples, other characteristics of light can be modulated from frame to frame in the sequence of patterns 108; a non-exhaustive list of such characteristics is listed above and is not repeated.

Figure 1B:
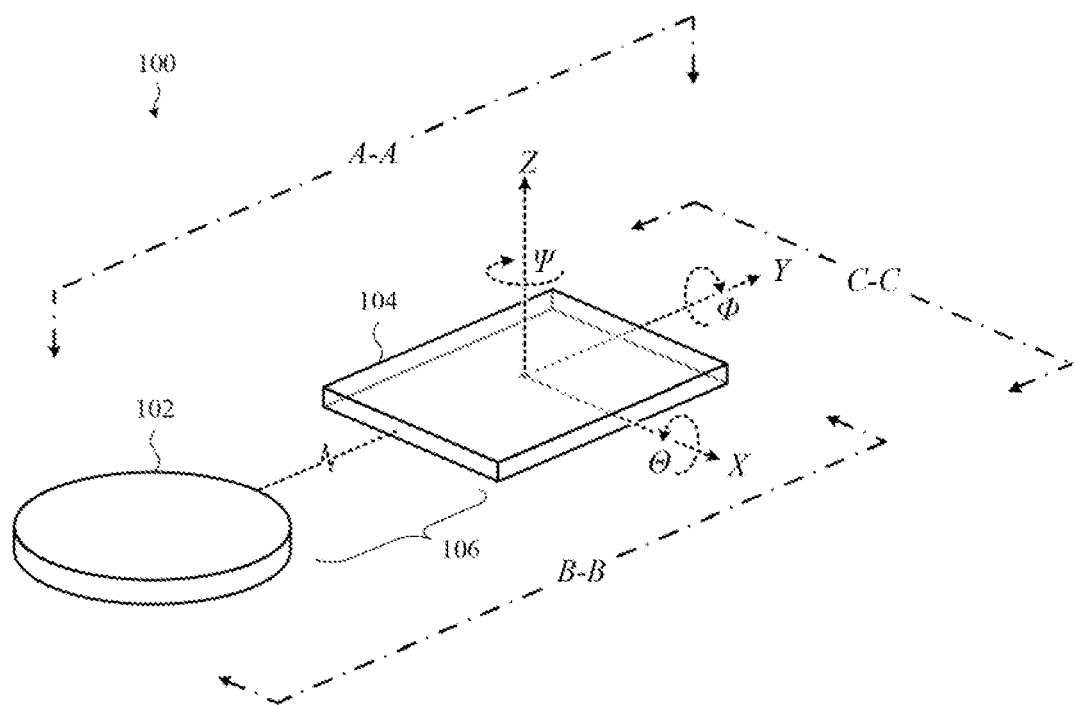
FIG. 1B depicts a simplified representation of a source device and an endpoint device, such as shown in FIG. 1A.

As noted above, in many cases, the endpoint device 104 is movable relative to the source device 102. FIG. 1B depicts the optical communication system 100 including six axes of potential movement, including three translational axes and three rotational axes. More specifically, the endpoint device 104 can move—relative to the source device 102—in three-dimensional space in an X-direction (e.g., to the left or to the right of the source device 102; see, e.g., FIG. 1C), in a Y-direction (e.g., toward or away from the source device 102; see, e.g., FIG. 1D), and/or in a Z-direction (e.g., above or below the source device 102; see, e.g., FIG. 1E). Similarly, the endpoint device 104 can rotate about the Y-direction axis to an angle 1 (e.g., roll; see, e.g., FIG. 1E), about the X-direction axis to an angle $\Theta$ (e.g., pitch; see, e.g., FIG. 1D), and/or about the Z-direction axis to an angle $\Psi$ (e.g., yaw; see, e.g., FIG. 1C).

Figure 2:
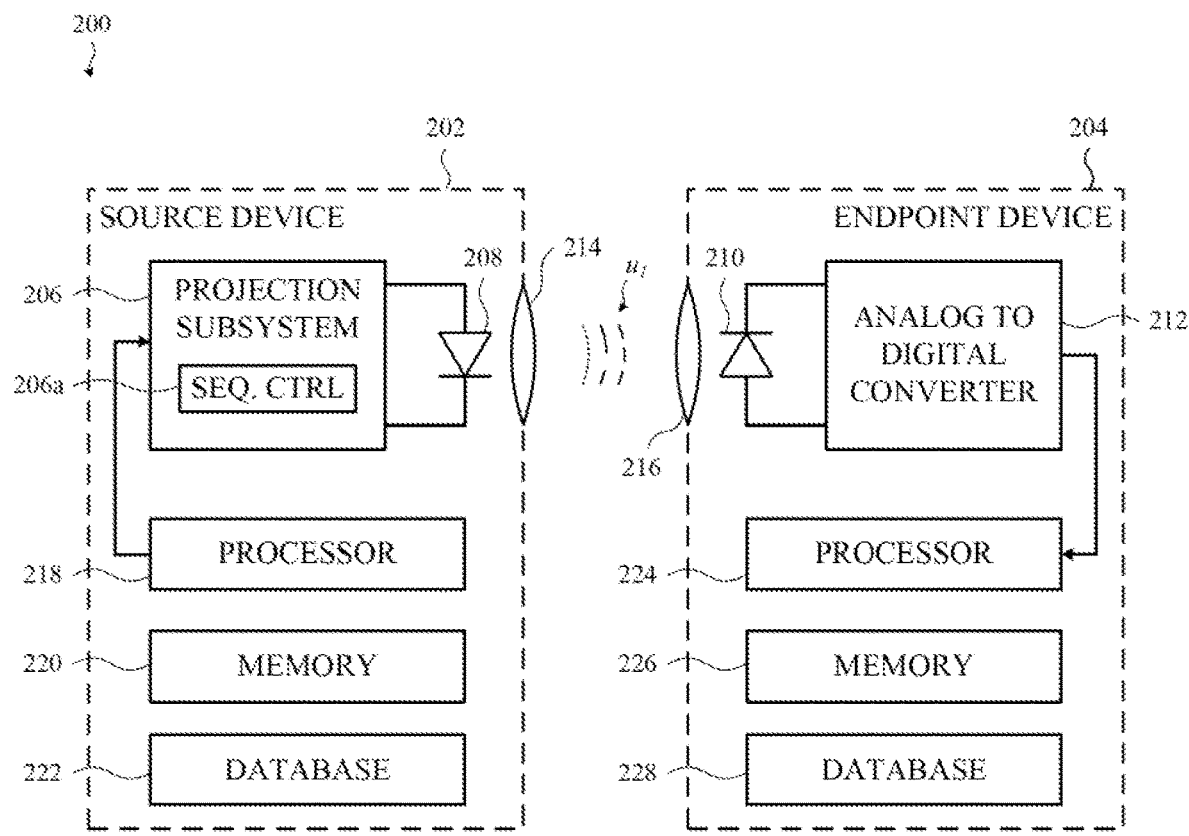
FIG. 2 is a simplified system diagram of the optical communication system of FIG. 1A.

FIG. 2 depicts a simplified system diagram of the optical communication system 100 of FIG. 1A. In this example embodiment, the system is identified as the optical communication system 200 and, like other embodiments described herein, includes a source device 202 and an endpoint device 204.

The source device 202 includes a projection subsystem 206 including a laser diode array 208 that projects light in a sequence of patterns—identified as the projected sequence $u_1$—toward a photodiode 210 in the endpoint device 204. The photodiode 210 in the endpoint device 204 is communicably coupled to an analog to digital converter 212 in the endpoint device 204 so that light received by the photodiode 210 can be converted into a digital value or a series of digital values suitable for further processing and/or analysis by the endpoint device 204.

As with other embodiments described herein, it may be appreciated that the projected sequence $u_1$ is typically a sequence of patterns, or frames, projected by the projection subsystem 206 toward the endpoint device 204. Each frame of the projected sequence $u_1$—three of which are shown in the illustrated embodiment—is projected into the field of view of the source device 202 that may span a selected angle. It may be appreciated that the size of the field of view (e.g., one or more dimensions of a conical or pyramidal region extending from the source device 202 into free space) can vary from embodiment to embodiment and may vary with one or more optical properties, adapters, structures, or lenses included in the source device 202 of the projection subsystem 206 of the source device 202.

For simplicity of description, the embodiments that follow are understood to reference a pyramidal field of view, extending outwardly from the projection subsystem 206 of the source device 202 that is defined by a selected angle. In some embodiments, the field of view as defined, at least in part, by the projection subsystem 206 of the source device 202 spans 120 degrees, generally centered on a longitudinal axis of the source device 202. In other embodiments, the field of view as defined, at least in part, by the projection subsystem 206 spans 90 degrees, generally centered on a longitudinal axis of the source device 202. In still further embodiments, the field of view of the source device 202 may be dynamically movable; the axis about which the field of view is generally centered may be shifted, rotated, pivoted, and/or otherwise controlled by the source device 202 and/or the projection subsystem 206 of the source device 202. For simplicity of description, the embodiments that follow may be understood to reference a field of view spanning a defined angle (e.g., 360 degrees, 270 degrees, 180 degrees, 135 degrees, 120 degrees, 90 degrees, and so on) and generally geometrically aligned with (e.g., parallel or perpendicular to) a longitudinal axis of the source device.

As with other embodiments described herein, each frame of the projected sequence $u_1$—three of which are shown in the illustrated embodiment—is divided into a set of segments, each segment being associated with a respective one angular division of the span of the field of view of the source device 202. The length of the projected sequence $u_1$ (e.g., the number of frames) and the number of segments of each frame (e.g., the number of angular divisions of the span of the field of view) can vary from embodiment to embodiment.

As a result of these and other described and equivalent illumination and/or projection techniques, after the projected sequence $u_1$ is projected in full (optionally, after one or more header frames is transmitted to indicate the start of the projected sequence $u_1$), each angular division of the field of view of the source device 202 is lit in a different manner from every other angular division of the field of view of the source device 202.

Phrased in another, non-limiting manner, the projection subsystem 206 of the source device 202 is configured to project unique binary or n-ary codes, simultaneously, into each angular division of the field of view of the source device 202. More specifically, each code is serially transmitted one bit per frame of the projected sequence $u_1$. In this manner, and as with other embodiments described herein, the source device 202 projects angular-encoded data into its field of view that can be received by the photodiode 210 of the endpoint device 204—or any other endpoint device or other observer in the field of view of the source device—and, in turn, to the analog to digital converter 212 of the endpoint device 204. Thereafter, the analog to digital converter 212 of the endpoint device 204 can convert the received serially-transmitted binary or n-ary code into a digital value.

In some embodiments, the analog to digital converter 212 of the endpoint device 204 is a multi-bit analog-to-digital converter configured to quantize a level of voltage output from the photodiode 210 into a series of digitally represented values. In other cases, the analog to digital converter 212 can be a single-bit analog-to-digital converter or a limiting amplifier configured to generate a sequence of voltages that correspond to serial digital data (e.g., ones and zeros). In other words, the analog to digital converter 212 can include a high-speed switching element (e.g., diode, transistor, and so) in order to quantize the voltage output from the photodiode 210 as either a binary one or a binary zero. In still other examples, the analog to digital converter 212 can be coupled to a buffer and/or shift register configured to convert serial information received from the source device 202 via the projected sequence $u_1$ into a parallel data that may be received and/or processed by other elements or components of the endpoint device 204.

In some embodiments, the source device 202 can also include other components, such as a passive or active optical structure, identified as the optical structure 214, that is configured to adjust one or more characteristics of the projected sequence $u_1$ (e.g., focus, direction, angle, divergence, color, polarization, and so on) as it exits the source device 202. For example, in one embodiment, the optical structure 214 can be configured to polarize light emitted from the projection subsystem 206 to a particular polarity. In another example, the optical structure 214 can be configured to reorient light emitted from the projection subsystem 206 to align with a particular axis or plane. In one implementation of this example, the optical structure 214 can be configured to rotate the projected sequence $u_1$ to counteract rotation of the source device 202 detected by a sensor within the source device 202, such as an accelerometer, gyroscope, or magnetometer. In still further examples, the optical structure 214 can be, or include, a mask, such a liquid crystal layer, that can serve as an intermediate image plane and, in turn, define each pattern of the projected sequence $u_1$.

Similar to the source device 202 described above, the endpoint device 204 can also optionally include an optical structure 216 to adjust one or more characteristics of the projected sequence $u_1$ before the projected sequence $u_1$ is received by the photodiode 210 and, in turn, the analog to digital converter 212.

In typical embodiments, the projection subsystem 206 of the source device 202 includes a drive circuit, also referred to as a sequence controller 206a, coupled to the laser diode array 208. The sequence controller 206a can be any suitable analog or digital circuit and/or purpose-configured processor, or combination thereof, configured to generate direct current and/or alternating current signals suitable to drive one or more lasers of the laser diode array 208, or a portion thereof, of the projection subsystem 206 to emit laser light according to a particular pattern or frame of the projected sequence $u_1$ or to emit laser light toward a mask or other intermediate image plane, such as described above. The sequence controller 206a can also be configured to drive the laser diode array 208 to produce one or more header frames before projecting a sequence, such as the projected sequence $u_1$, to indicate to an endpoint device to prepare to receive the projected sequence $u_1$. In some cases, the sequence controller 206a causes the laser diode array 208 to flash in a particular manner (e.g., alternating colors, alternating illumination, and so on) in order to transmit the one or more header frames.

In some examples, the sequence controller 206a of the projection subsystem 206 of the source device 202 is configured to control a level of current circulated through one or more of the laser diodes of the laser diode array 208 of the projection subsystem 206, although this may not be required; other embodiments may control a voltage applied across one or more laser diodes of the laser diode array 208 of the projection subsystem 206. The sequence controller 206a can apply any suitable current or voltage waveform to cause the projection subsystem 206 to emit laser light in any suitable manner (e.g., pulse width, duty cycle, color, frequency, amplitude, spectral content, and so on). The laser light emitted from the laser diode array 208 of the projection subsystem 206 may be monochromatic or polychromatic.

The source device 202 can also include other components, including, without limitation, a processor 218, a memory 220, a database 222, and so on. The processor 218 of the source device 202 can be configured to access and execute instructions stored in the memory 220 in order to instantiate any number of suitable classes, objects, virtual machines, threads, pipelines, and/or routines to perform, monitor, and/or coordinate one or more operations of the source device 202. Further, the processor 218 can be communicably coupled—either directly (e.g., via general-purpose input/output pins) or indirectly (e.g., via an intermediary circuit or integrated circuit)—to other components of the source device 202 (e.g., display, haptic output components, input components, and so on). In this manner, the processor 218 can coordinate the operation of the various hardware components of the source device 202.

Similar to the source device 202 described above, the endpoint device 204 can also include a processor 224, a memory 226, a database 228, and so on, each of which may be communicably coupled to the analog to digital converter 212. Similar to the processor 218 of the source device 202 described above, in many configurations, the processor 224 of the endpoint device 204 can be configured to access and execute instructions stored in the memory 226 in order to instantiate any number of suitable classes, objects, virtual machines, threads, pipelines, and/or routines to perform, monitor, and/or coordinate one or more operations of the endpoint device 204. Further, the processor 224 can be communicably coupled—either directly (e.g., via general-purpose input/output pins) or indirectly (e.g., via an intermediary circuit or integrated circuit)—to various hardware components of the endpoint device 204.

In this manner, and as a result of this construction, the endpoint device 204 can receive digital information in the form of one or more serially-projected codes from the source device 202, via the optical communication link established between the projection subsystem 206 of the source device 202 and the photodiode 210 of the endpoint device 202. As noted above, the serially-projected codes(s) received by the endpoint device 204 varies based on the relative angular position of the endpoint device 204 and the source device 204. As a result, once the serially-projected codes(s) is/are received by the endpoint device 204, the serially-projected codes(s) can be immediately correlated to value that corresponds to an angular offset between the source device 202 and the endpoint device 204.

For example, in one embodiment, the endpoint device 204 is collimated relative to the source device 202. In this embodiment, the endpoint device 204 can receive, from the source device 202, a serially-projected code that corresponds to 0 degrees of angular offset. More specifically, the endpoint device 204 can receive the serially-projected codes and can look up the serially-projected codes in a lookup table or other relational or other database stored in, or accessible to, the endpoint device 204 (such as the database 228 or another database stored in the memory 226; a remote database, including a database stored or hosted by the source device 202, may be accessed by the endpoint device 204 in other embodiments). The lookup value returned to the endpoint device 204 can be a digital representation of the angular offset between the source device and the endpoint device. For example, in this embodiment, the lookup value returned to the endpoint device 204 based on the serially-projected code received by the endpoint device 204 can be 0, representing that the angular offset between the source device 202 and the endpoint device 204 is 0 degrees.

In another embodiment, the endpoint device 204 is offset by 15 degrees relative to a central or longitudinal axis of the source device 202. As noted with respect to other embodiments described here, as a result of the offset, the endpoint device 204 receives a different serially-projected code than that which it received when the endpoint device 204 was collimated with the source device 202 in the preceding example. In this example, as with the preceding example, the serially-projected code received by the endpoint device 204 is used to look up a value in a suitable local or remote database or table accessible to the endpoint device 204. In this embodiment, the lookup value returned to the endpoint device 204 based on the serially-projected code received by the endpoint device 204 is 15, representing that the angular offset between the source device 202 and the endpoint device 204 is 15 degrees relative to the source device.

One may appreciate that an angular offset between a source device and endpoint device such as described herein can result from both positional offset and angular offset. For example, if two collimated devices (see, e.g., FIG. 1B) are laterally translated relative to each other (e.g., along the X axis as shown in FIG. 1C), the serially-projected code received by the endpoint device, after a sequence of frames or patterns is projected by the source device, will change as a function of the ratio between the lateral offset and the distance separating the source device and the endpoint device (e.g., the sine of the angle corresponding to the serially-projected code received by the endpoint device).

Figure 1C:
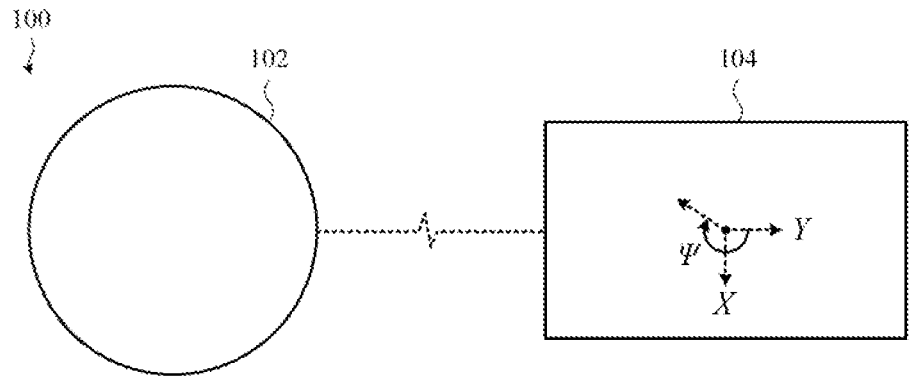
FIG. 1C depicts the devices of FIG. 1B, viewed along line A-A.
Figure 1D:
FIG. 1D depicts the devices of FIG. 1B, viewed along line B-B.
Figure 1E:
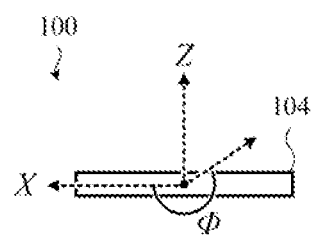
FIG. 1E depicts the devices of FIG. 1B, viewed along line C-C.

Similarly, if two collimated devices (see, e.g., FIG. 1B) are rotated relative to each other (e.g., rotated about the $\Psi$ axis as shown in FIG. 1C), the serially-projected code received by the endpoint device, after a sequence of frames or patterns is projected by the source device, will change as a function of the angular offset between the devices (e.g., the angle corresponding to the serially-projected code received by the endpoint device).

Further, if two collimated devices (see, e.g., FIG. 1B) are both rotated relative to each other (e.g., rotated about the $\Psi$ axis as shown in FIG. 1C) and laterally translated relative to each other (e.g., along the X axis as shown in FIG. 1C), the serially-projected code received by the endpoint device, after a sequence of frames or patterns is projected by the source device, will change as a function of the angular offset between the devices (e.g., the angle corresponding to the serially-projected code received by the endpoint device) and as a function of the ratio between the lateral offset and the distance separating the source device and the endpoint device (e.g., the sine of the angle corresponding to the serially-projected code received by the endpoint device).

As such, it may be appreciated that an endpoint device configured to receive a single serially-projected code may not readily, without additional information, distinguish between lateral translation relative to a source device and an angular translation relative to a source device. Accordingly, some embodiments described herein reference an endpoint device configured to use angular offset information obtained after receiving a serially-projected code to inform, adjust, or otherwise change an output from another positional sensor, such as an inertial measurement unit, a gyroscope, a magnetometer (e.g., compass), or an accelerometer. In these embodiments, output from the positional sensor can be adjusted based on the angular offset information obtained after receiving a serially-projected code.

In further embodiments, an endpoint device, such as described herein, can include more than one photodiode and, in turn, can receive more than one serially-projected code. In these example embodiments, the endpoint device can include two collinear-aligned photodiodes separated by a known distance. As a result of the separation, the two photodiodes of the endpoint device may each receive a different serially-projected code corresponding to two different angular offsets relative to the source device. It may be appreciated that the two different angular offsets, together with the known distance separating the photodiodes, and (optionally) together with output from one or more internal positional sensors, such as an inertial measurement unit, a gyroscope, a magnetometer (e.g., compass), or an accelerometer, the endpoint device can triangulate its position in free space relative to the source device, including both a distance separating the source device and the endpoint device and an angular offset between the source device and the endpoint device. For example, it may be appreciated that the closer the source device and the endpoint device are to one another, the greater the difference between the angles associated with the serially-projected codes received by the photodiodes of the endpoint device will be. Similarly, if the serially-projected codes received by the photodiodes of the endpoint device are the same, the endpoint device can determine a minimum distance separating the endpoint device and the source device.

In still further embodiments, an endpoint device, such as described herein, can include more than two photodiodes—such as an array or constellation of photodiodes—arranged in a particular pattern. As with the preceding example, each photodiode of the array or constellation of photodiodes can receive a different serially-projected code. In these embodiments, as it may be appreciated, the various angles associated with the various photodiodes of the array or constellation of photodiodes, along with the geometry of the array or constellation of photodiodes, can be used by the source device to calculate and/or otherwise determine the angular and spatial position of the endpoint device relative to the source device. A number of triangulation and/or trilateration techniques may be suitable in various embodiments.

In still further embodiments, a source device, such as described herein, can be configured to project more than one sequence of patterns. For example, a source device can be configured to project a first sequence of patterns, segments of which are generally parallel to a vertical axis of the field of view of the source device and, thereafter, therewith, or before, to project a second sequence of patterns, segments of which are generally perpendicular to the vertical axis of the field of view. In these embodiments, the serially-projected code(s) received by an endpoint device after the first sequence of patterns is projected can correspond to angular offset(s) within the plane perpendicular to the vertical axis of the field of view (see, e.g., FIG. 1C) whereas the serially-projected code(s) received by the endpoint device after the second sequence of patterns is projected can correspond to angular offset(s) within the plane perpendicular to the horizontal axis of the field of view (see, e.g., FIG. 1D).

In further embodiments, a source device, such as described herein, can be configured to project multiple sequences of patterns, each sequence of patterns associated with a particular angular offset relative to a particular plane.

Accordingly, generally and broadly in view of FIGS. 1A-2, it is understood that an optical communication system, such as described herein, can be configured in a number of suitable ways, each of which facilitates determination of relative positions between two or more electronic devices. For example, as noted above, certain electronic devices can operate as both a source device and an endpoint device. In these examples, two-way optical positioning can be achieved.

Thus, it is understood that the foregoing descriptions of specific embodiments are presented for the purposes of illustration and description. These descriptions are not exhaustive nor intended to limit the disclosure to the precise forms recited herein. To the contrary, it will be apparent to one of ordinary skill in the art that many modifications and variations are possible in view of the above teachings.

Figure 3:
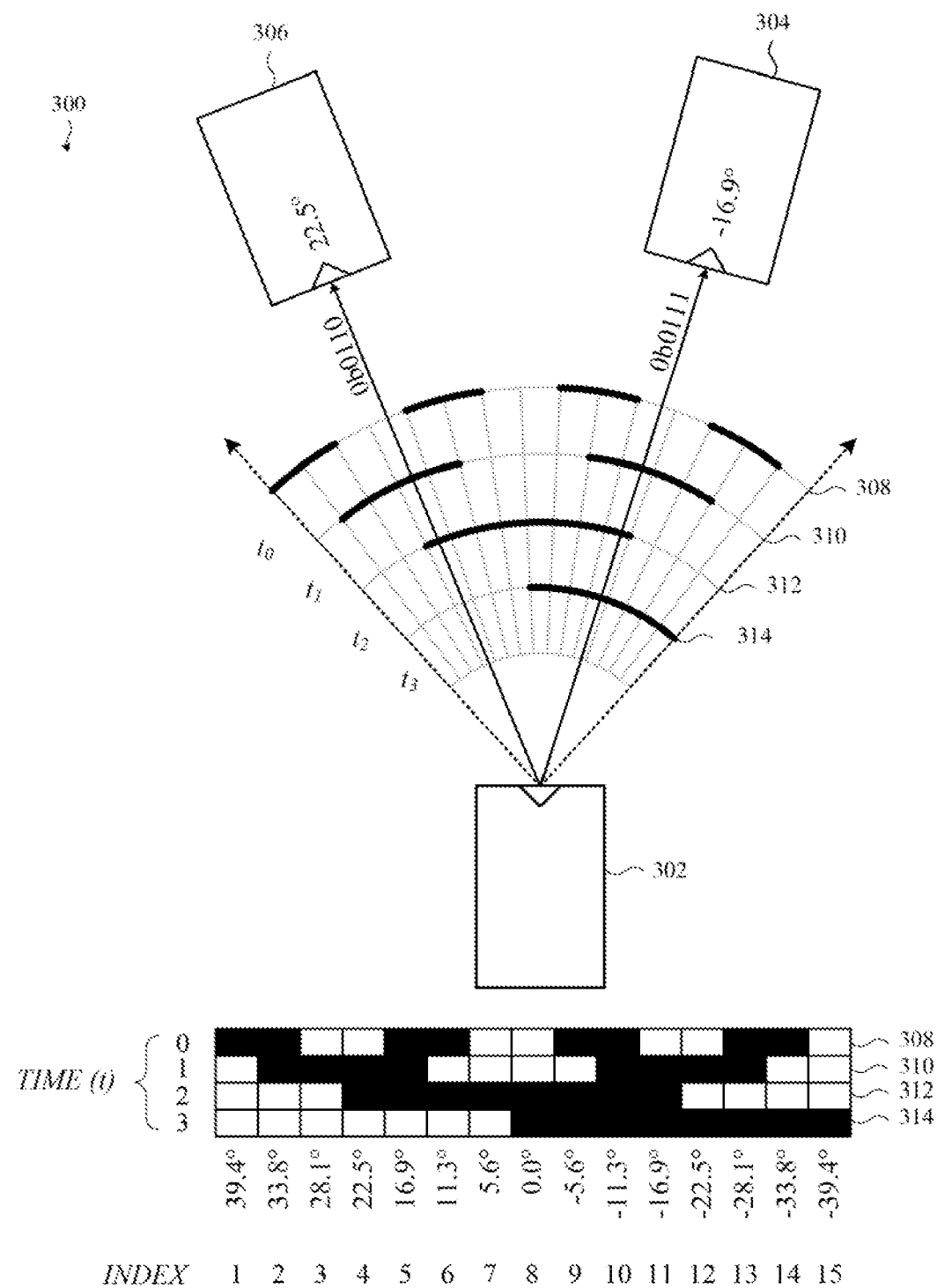
FIG. 3 depicts a source device of an optical communication system, such as described herein, projecting a sequence of patterns or frames toward two endpoint devices.

For example, FIG. 3 depicts an optical communication system 300 that includes a source device 302 projecting a sequence of patterns (or frames) into an approximately eighty-degree field of view toward two endpoint devices, identified as the endpoint device 304 and the endpoint device 306. As illustrated, the endpoint device 304 and the endpoint device 306 have different angular positions with respect to the source device 302.

In the illustrated example, the source device 302 projects four discrete patterns or frames into its field of view. In particular: the source device 302 projects the pattern 308 at time to; the pattern 310 at time $t_1$; the pattern 312 at time $t_2$; and the pattern 314 at time $t_3$.

As with other embodiments described herein, each of the patterns 308, 310, 312, and 314 are divided into evenly-distributed segments. In particular, in the illustrated embodiment, the patterns 308, 310, 312, and 314 are divided into fifteen (15) segments, which are indexed sequentially in the illustration from left to right with indexes 1-15. As with other embodiments described herein, each of the indexed segments 1-15 are each associated with one respective angular division of the eighty-degree field of view of the source device 302. In particular, each indexed segment in the illustrated embodiment corresponds to, approximately, a 5 degree division of the eighty-degree field of view. For example, in the illustrated embodiment, the indexed segment 1 corresponds to an angle of 39.4 degrees offset from a central axis of the source device 302 whereas the indexed segment 15 corresponds to an angle of −39.4 degrees offset from the central axis of the source device 302.

In this manner, as with other embodiments described herein, after each of the patterns 308, 310, 312, and 314 have been projected by the source device 302, each angular division of the eighty-degree field of view is lit with a unique four-bit binary code; each bit of each four-bit binary code corresponds to one segment of one of the patterns 308, 310, 312, and 314. In this manner, an observer—such as an endpoint device—of the source device 304 receives and/or detects a different unique four-bit binary code depending upon the observer's angular position relative to the source device 302.

For example, as shown in FIG. 3, the endpoint device 304 is positioned in such a manner so as to observe, receive, or otherwise detect one or more characteristics of light projected from the source device 302. A non-exhaustive list of example characteristics of light that can be detected by an endpoint device, such as described herein, are described above and are not repeated. For simplicity of description and illustration, however, the following embodiments are described in reference to a source device and an endpoint device—such as the source device 302 and the endpoint devices 304, 306 as shown in FIG. 3—that are configured for optical communication according to a binary encoding schema in which an absence of light corresponds to a digital zero and a presence of light corresponds to a digital one. In the illustrated embodiment, a thickened line is understood to correspond to the presence of light and, in turn, a digital one.

Using the above-referenced binary encoding schema example, and in reference to FIG. 3, it may be appreciated that the endpoint device 304 is positioned in such a manner so as to detect: a digital zero at time to; a digital one at time $t_1$; a digital one at time $t_2$; and a digital one at time $t_3$.

In other words, after each of the patterns 308, 310, 312, and 314 are projected by the source device 302, the endpoint device 304 receives, in little-endian format, a binary code of 0b0111 which, in turn, can be correlated (e.g., via the endpoint device 304 accessing a lookup table or other database, whether local or remote) to indexed segment 11 which is associated with a −16.9 degree offset from the central axis of the source device 302. As with other embodiments described herein, when the endpoint device 304 is moved relative to the source device 302, the binary code received by the endpoint device 304 will change.

Similarly, it may be appreciated that the endpoint device 306 is positioned in such a manner so as to detect: a digital zero at time to; a digital one at time $t_1$; a digital one at time $t_2$; and a digital zero at time $t_3$. In other words, after each of the patterns 308, 310, 312, and 314 are projected by the source device 302, the endpoint device 306 receives, in little-endian format, a binary code of 0b0110 which, in turn, can be correlated (e.g., via the endpoint device 306 accessing a lookup table or other database, whether local or remote) to indexed segment 4 which is associated with a 22.5 degree offset from the central axis of the source device 302. As with other embodiments described herein, when the endpoint device 306 is moved relative to the source device 302, the binary code received by the endpoint device 306 will change.

It may be appreciated that the foregoing description of FIG. 3, and the various alternatives thereof and variations thereto are presented, generally, for purposes of explanation, and to facilitate a thorough understanding of various possible configurations of an optical communication system, such as described herein. However, it will be apparent to one skilled in the art that some of the specific details presented herein may not be required in order to practice a particular described embodiment, or an equivalent thereof.

Thus, it is understood that the foregoing descriptions of specific embodiments are presented for the limited purposes of illustration and description. These descriptions are not exhaustive nor intended to limit the disclosure to the precise forms recited herein. To the contrary, it will be apparent to one of ordinary skill in the art that many modifications and variations are possible in view of the above teachings.

For example, it may be appreciated that the patterns projected by a source device—such as the source device 302—can encode angular information into each angular division of its field of view in a number of suitable ways. In FIG. 3, the patterns 308, 310, 312, and 314 encode angular information using a reflected binary encoding schema (also referred to as a Gray code).

In other embodiments, the patterns 308, 310, 312, and 314 can encode angular information using a standard binary coding schema, a long-run reflected binary encoding schema (also referred to as a long-run Gray code), or any other suitable encoding schema, whether encrypted or otherwise. In many cases, a reflected binary encoding schema or a long-run reflected binary encoding schema may be selected for particular implementations so that incremental relative angular position changes between an endpoint device and a source device result in a single digital bit increment or decrement in the associated projected digital code.

Figure 4A:
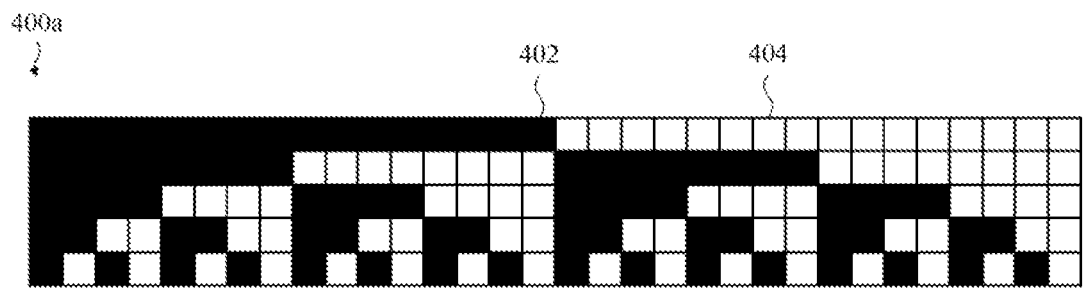
FIG. 4A is a chart depicting a sequence of patterns or frames encoded according to a binary encoding schema that may be projected by a source device of an optical communication system, such as described herein.

Generally and broadly, FIGS. 4A-4D depict various example pattern sequences that may be projected by a source device, such as described herein. In particular, FIG. 4A depicts an example sequence of patterns 400a that includes five discrete frames, divided into thirty-two discrete segments, that are configured to be projected in sequence and that encode angular information according to a binary encoding schema in which a digital one is represented by the presence of light (see, e.g., the illuminated segment 402) and a digital zero is represented by the absence of light (see, e.g., the non-illuminated segment 404).

Figure 4B:
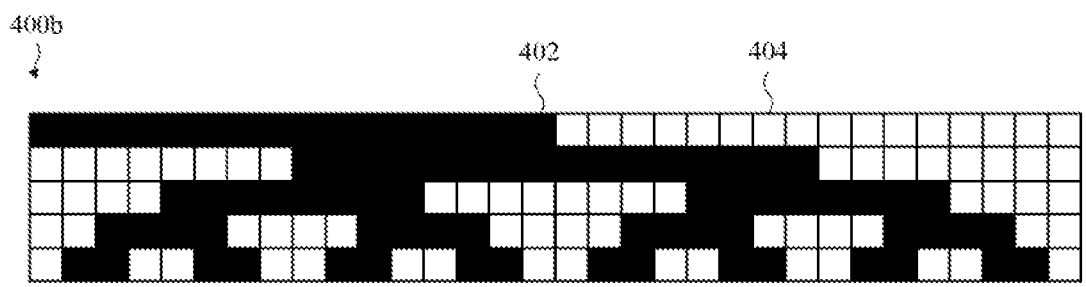
FIG. 4B is a chart depicting a sequence of patterns or frames encoded according to a reflected binary encoding schema that may be projected by a source device of an optical communication system, such as described herein.

FIG. 4B depicts another example sequence of patterns 400b that includes five discrete frames, divided into thirty-two discrete segments, that are configured to be projected in sequence and that encode angular information according to a reflected binary encoding schema in which a digital one is represented by the presence of light (see, e.g., the illuminated segment 402) and a digital zero is represented by the absence of light (see, e.g., the non-illuminated segment 404). In contrast with the example sequence of patterns 400a depicted in FIG. 4A, the five-bit digital codes projected into the field of view (e.g., the columns of the example sequence of patterns 400b), and associated with one specific angular division of that field of view, only change by one bit between angular divisions.

Figure 4C:
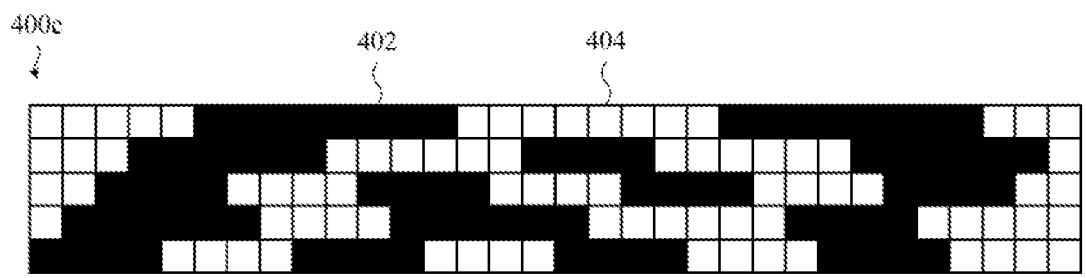
FIG. 4C is a chart depicting a sequence of patterns or frames encoded according to a long-run reflected binary encoding schema that may be projected by a source device of an optical communication system, such as described herein.

FIG. 4C depicts another example sequence of patterns 400c that includes five discrete frames, divided into thirty-two discrete segments, that are configured to be projected in sequence and that encode angular information according to a long-run reflected binary encoding schema in which a digital one is represented by the presence of light (see, e.g., the illuminated segment 402) and a digital zero is represented by the absence of light (see, e.g., the non-illuminated segment 404). Similar to the example sequence of patterns 400b depicted in FIG. 4B, the five-bit digital codes projected into the field of view (e.g., the columns of the example sequence of patterns 400c) only change by one bit between the associated angular divisions of that field of view. However, in contrast to the example sequence of patterns 400b, the example sequence of patterns 400c is configured to maximize, to the greatest extent possible, the number of adjacent segments of each pattern projected that share the same digital value. Phrased in another, non-limiting, manner, the example sequence of patterns 400c is configured to maximize the number of adjacent segments of each pattern that are associated with a digital one.

Figure 4D:
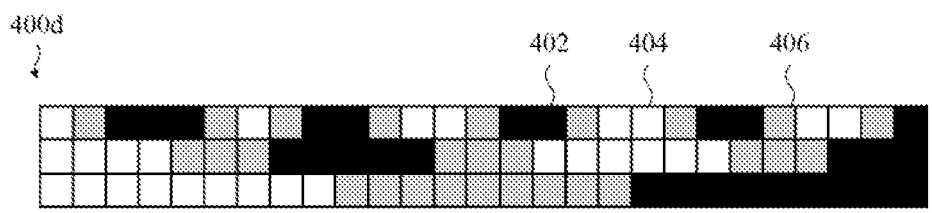
FIG. 4D is a chart depicting a sequence of patterns or frames encoded according to a n-ary encoding schema (e.g., ternary, quaternary, and so on) that may be projected by a source device of an optical communication system, such as described herein.

FIG. 4D depicts yet another example sequence of patterns 400d that includes three discrete frames, divided into twenty-seven discrete segments, that are configured to be projected in sequence and that encode angular information according to a long-run reflected ternary encoding schema in which: a digital one is represented by the presence of light exhibiting a first characteristic (see, e.g., the illuminated segment 402), such as a first brightness, phase, polarization, color and so on; a digital zero is represented by the absence of light (see, e.g., the non-illuminated segment 404); and a digital two is represented by the presence of light exhibiting a second characteristic, different from the first characteristic (see, e.g., the illuminated segment 406), such as a different brightness, phase, polarization, color and so on.

It may be appreciated that the foregoing description of FIGS. 4A-4D, and the various alternatives thereof and variations thereto, are presented, generally, for purposes of explanation, and to facilitate a thorough understanding of various possible patterns of light configured to be projected by a source device—or more particularly, by a projection subsystem of a source device—in a sequence and in such a manner and that encodes angular information. However, it will be apparent to one skilled in the art that some of the specific details presented herein may not be required in order to practice a particular described embodiment, or an equivalent thereof.

Thus, it is understood that the foregoing descriptions of specific embodiments are presented for the limited purposes of illustration and description. These descriptions are not exhaustive nor intended to limit the disclosure to the precise forms recited herein. To the contrary, it will be apparent to one of ordinary skill in the art that many modifications and variations are possible in view of the above teachings.

Accordingly, for simplicity of description, the embodiments that follow are understood to reference a source device configured to project angular-encoded information into its field of view according to a long-run reflected binary encoding schema, such as shown in FIG. 4C. The manner by which the source device—or, more particularly, a projection subsystem of the source device—projects these patterns, however, can vary from embodiment to embodiment.

For example, a projection subsystem can include an array of laser diodes that are each individually-controllable and addressed. In this example, different laser diodes of the array can be illuminated in order to project a particular or desired pattern or a portion or section of a desired pattern.

In another example, a projection subsystem can include an array of laser diodes that are arranged in groups. Each group of laser diodes can take a specific shape that corresponds to one or more illuminated segments of a pattern of a sequence of patterns.

In still further embodiments, a projection subsystem can include an array of laser diodes positioned behind or relative to an intermediate image plane, such as a static or dynamic mask. As light is emitting from the array of laser diodes, only a portion of the laser light may be blocked by the intermediate image plane, thereby patterning the laser light.

These foregoing and other embodiments are discussed below with reference to FIGS. 5A-9. However, those skilled in the art will readily appreciate that the detailed description given herein with respect to these figures is for explanatory purposes only and should not be construed as limiting.

Figure 5A:
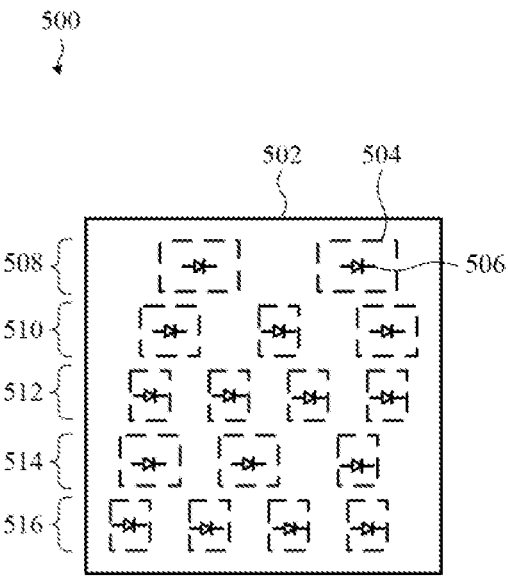
FIGS. 5A-5C depict example constructions of a solid-state projection subsystem of a source device, such as described herein.
Figure 5B:
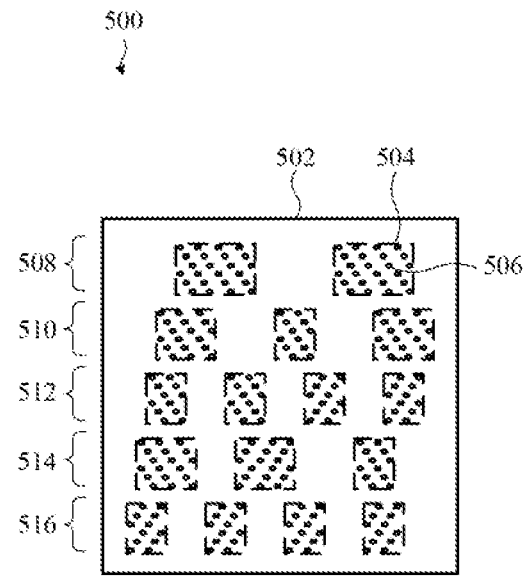
Figure 5C:
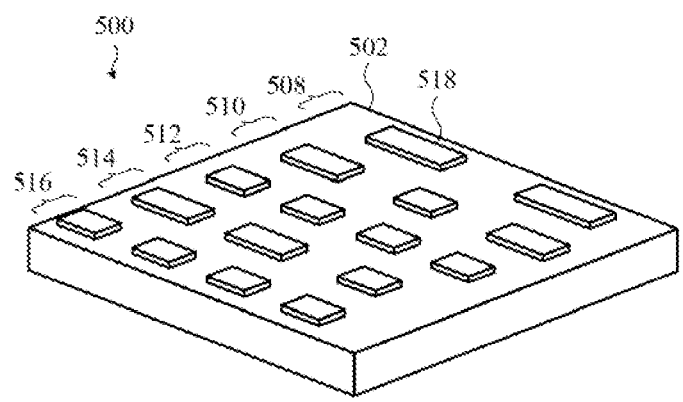

For example, generally and broadly, FIGS. 5A-5C depict various example solid-state projection subsystems that can be incorporated by a source device, such as described herein. In these embodiments, the projection subsystem includes an array of laser diodes that are arranged in groups corresponding to portions of a long-run reflected binary encoding schema. As a result of this construction, specific patterns can be projected by the projection subsystem by selectively illuminating specific groups of laser diodes.

FIG. 5A depicts a projection subsystem 500. The projection subsystem 500 is configured as a solid-state projection subsystem that is configured to project at last five discrete patterns. By projecting these patterns in sequence, the projection subsystem 500 can effectively illuminate a field of view of a source device with angular-encoded information, such as described in reference to other embodiments discussed herein; this description is not repeated.

In particular, the projection subsystem 500 includes a substrate 502 onto which and/or into which one or more light emitting regions are defined. The substrate 502 can be made or manufactured from any number of suitable materials or combinations of materials in a single-layer or multi-layer configuration, such materials including, but not limited to: semiconductor materials; metals; plastics; nylon and polymer materials; ceramic materials; conductive materials; dielectric materials; glass; sapphire; and so on. The substrate 502 can be a rigid or flexible substrate. In some cases, the substrate 502 may be transparent or optically reflective. In some cases, the substrate 502 may be optically opaque.

In some cases, the substrate 502 may be a portion of another substrate or element within a source device such as described herein. For example, the substrate 502 can be a portion of a main or daughter logic board. In other cases, the substrate 502 can be a portion of a housing or enclosure of a source device.

In still further examples, the substrate 502 can be formed into a different shape than the rectangular/square shape depicted in FIGS. 5A-5C. For example, in some cases, the substrate 502 is formed into a polygonal shape or a circular shape.

In the illustrated embodiment, sixteen discrete light emitting regions are defined onto the substrate 502. One of the light emitting regions is identified as the region 504. The light emitting regions can each include one or more light emitting elements (e.g., the light emitting element 506), such as, but not limited to: VCSELs; vertical external-cavity surface-emitting lasers; light-emitting diodes; organic light-emitting diodes; resonant-cavity light-emitting diodes; micro-scale light-emitting diodes; superluminescent light-emitting diodes; broad-area laser diodes; diode-pumped lasers; mode-locked diode lasers; infrared band lasers; ultraviolet band lasers; and so on. In some cases, each light emitting region includes only a single light emitting element, such as shown in FIG. 5A. In other cases, such as shown in FIG. 5B, multiple discrete light emitting elements can be associated with each light emitting region. Further embodiments can be implemented in still other ways.

It may be appreciated that the light emitting element(s) associated with each light emitting region can be defined into/onto the substrate 502 and/or disposed into/onto the substrate 502 in a number of suitable ways. For example, in some embodiments, a semiconductor manufacturing process can simultaneously form and/or define one or more features of the substrate while one or more of the light emitting elements or regions are also defined. More generally, it may be appreciated that the light emitting elements—and any associated drive circuitry, traces, connection wires, jumpers, interposers, breakouts, pins, and so on—can be coupled to and/or formed onto the substrate 502 in any suitable manner.

In the illustrated embodiment, the light emitting regions defined on the substrate 502 are disposed into five distinct rows that, in turn, define the five discrete patterns that the projection subsystem 500 is configured to project. These patterns are identified in the illustration as the patterns 508, 510, 512, 514, and 516. In this manner, and as a result of this construction, the projection subsystem 500 can illuminate the five patterns in sequence, one at a time, in order to project angular-encoded information at a resolution of five bits.

It may be appreciated that the layout of the light emitting regions on the substrate 502 of the projection subsystem 500 corresponds to the long-run reflected binary pattern shown in FIG. 4C. In other cases, especially for embodiments adopting a different encoding schema, a different layout of the light emitting regions on the substrate 502 may be suitable.

For example, the patterns of light emitting regions can be disposed in another manner than shown in FIGS. 5A-5C. More particularly, as noted above, in the illustrated embodiment, the patterns 508, 510, 512, 514, and 516 are shown as rows that are physically separated from one another, while maintaining vertical alignment relative to one another. This may not be required of all embodiments. For example, in another embodiment, the patterns 508, 510, 512, 514, and 516 can be arranged in a single row. In yet another embodiment, the patterns 508, 510, 512, 514, and 516 can be layered atop one another; in such embodiments, each light emitting region may be at least partially transparent in order to facilitate transmission of light emitted from light emitting regions positioned below it.

It may be appreciated that the foregoing example embodiments presented with respect to various layouts of the patterns 508, 510, 512, 514, and 516 are not exhaustive; in other embodiments other patterns may be possible.

In some embodiments, an optical element can be positioned one or more of the light emitting regions defined on the substrate 502. For example, as shown in FIG. 5C, each light emitting region defined on the substrate 502 is positioned below an optical element, one of which is labeled as the optical element 518.

The optical elements, including the optical element 518, can be any suitable active or passive optical element—or combination of multiple optical elements (e.g., provided in multiple layers) including, but not limited to: microlens; macrolens; reflectors; condensers; collimators; narrow field of view filters; polarizers; and so on. The optical elements can be configured to modify one or more properties of light emitted from the light emitting regions in any suitable manner including, but not limited to: directing emitted light toward a mirror, lens, or other optical structure (not shown); focusing emitted light; diverting emitted light; collimating emitted light; filtering emitting light to a particular color; filtering a particular color from the emitted light; polarizing the emitted light; and so on. In many examples, the optical elements can be configured to diverge the light emitted from the light emitting regions according to a particular selected divergence angle. In many cases, although not required, the selected divergence angle imparted t the light emitted from the light emitting regions at least partially defines a field of view for the projection subsystem 500.

The optical elements, including the optical element 518, can be formed and/or disposed onto each respective light emitting region in any suitable manner including, but not limited to: by adhesive; by printing; by additive manufacturing; by pick and place; by reflowing; and so on. It may be appreciated that different deposition techniques and/or different attachment techniques may be suitable to couple a particular selected optical element to a particular selected light emitting region.

As a result of this described and other equivalent constructions, the projection subsystem 500 can be operated by a source device, such as described herein, to project a sequence of patterns or frames encoded according to a long-run reflected binary encoding schema (or other encoding schema) into a field of view extending from the source device such that an endpoint device, such as described herein, within that field of view can receive a unique serially-projected digital code that corresponds to, or can be correlated to, the angular offset between the source device and the endpoint device. It may be appreciated that the five discrete patterns depicted are merely one example configuration; in other cases, more than one given discrete pattern can be projected by a projection subsystem such as the projection subsystem 500. Further, it may be appreciated that, in many cases, the number of patterns or frames, together with a particular selected encoding schema, can define the number of bits for each serially-projected code and, as a result, the number of angular divisions of the field of view. For example, five patterns or frames encoded according to a binary encoding schema can result in thirty two possible angular divisions of a field of view, whereas ten patterns or frames, encoded according to a ternary encoding schema can result in roughly sixty-thousand (e.g., 59,049) possible angular divisions of a field of view.

Figure 6:
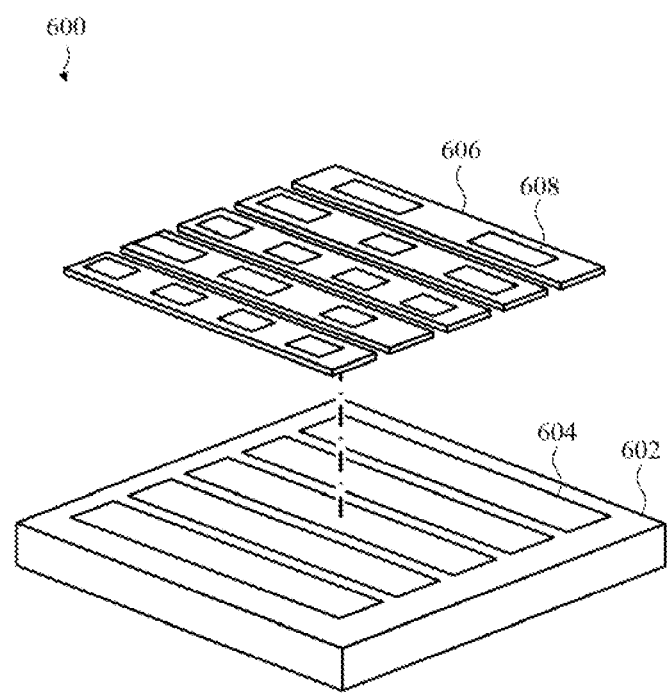
FIG. 6 depicts an example construction of a projection subsystem of a source device, such as described herein.

In another embodiment, an optical element can be a mask positioned over a light emitting area defined on a substrate. FIG. 6 depicts a projection subsystem 600 that includes a substrate 602. In this example, five light emitting regions, one of which is identified in the figure as the light emitting region 604, can be disposed onto or otherwise formed onto the substrate 602. Suitable materials and constructions for the substrate 602 and the light emitting region 604 are non-exhaustively listed above and are not repeated. In this embodiment, an optical mask can be positioned over each light emitting region. One optical mask is identified in the figure as the optical mask 606. Each optical mask includes one or more transparent regions—one of which is identified as the transparent region 608—that serve to define an intermediate image plane that selectively blocks light emitted from the light emitting regions.

The optical masks, including the optical mask 606, can be made and/or formed in a number of suitable ways. For example, in one embodiment, the optical masks are formed from a transparent material that has been coated with an optically opaque ink layer. In other cases, the optical masks are formed from an optically opaque material; in these embodiments, the transparent regions can be formed by defining apertures through the optically opaque material. In some cases, the apertures can be filled with an optically transparent material, but this may not be required of all embodiments.

Figure 7A:
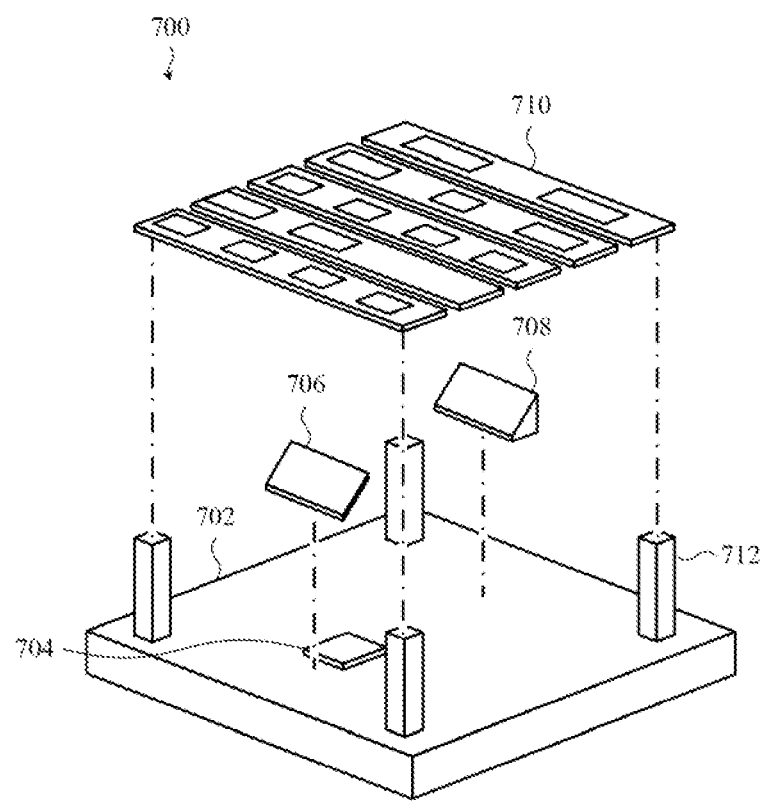
FIGS. 7A-7B depict an example construction of a projection subsystem of a source device, such as described herein.

FIG. 7A depicts yet another projection subsystem, identified as the projection subsystem 700. In this embodiment, the projection subsystem 700 includes a substrate 702 onto which a single light emitting element is formed or disposed. The light emitting element is identified as the light source 704. In this embodiment, the light source 704 is positioned and aligned below a reflector 706 that directs light emitted from the light source 704 toward a second reflector 708. The second reflector 708 may be an electrically-controllable mirror that can tilt in one or more directions to direct light emitted from the light source 704 toward an optical mask 710 (such as described in reference to FIG. 6) that is separated from the substrate and supported, at least in part, by a set of standoffs, one of which is identified as the standoff 712.

Figure 7B:
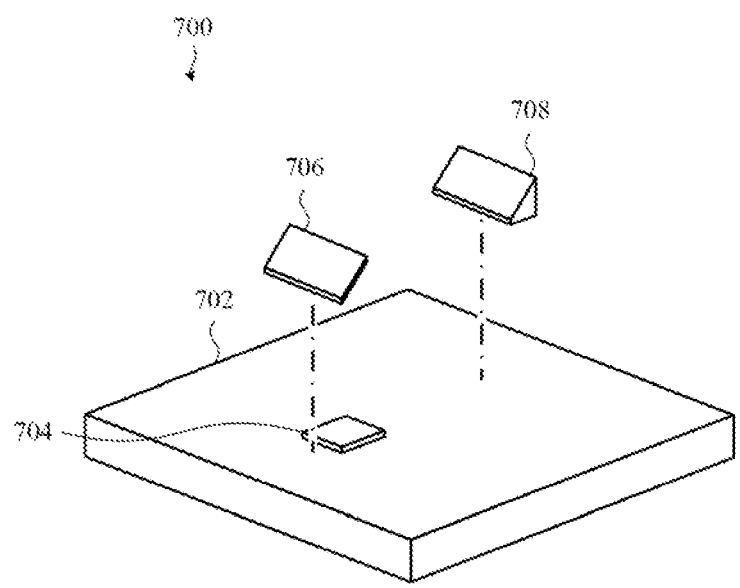

In yet another embodiment shown in FIG. 7B, an optical mask may not be required. In this embodiment, the second reflector 708 may be a digital light processing circuit configured to selectively reflect and/or redirect light emitted from the light source 704.

As a result of these described and other equivalent constructions, the projection subsystem 600 depicted in FIG. 6 and the projection subsystems 700 depicted in FIGS. 7A-7B can be operated by a source device, such as described herein, to project a sequence of patterns or frames encoded according to a long-run reflected binary encoding schema (or other encoding schema) into a field of view extending from the source device such that an endpoint device, such as described herein, within that field of view can receive a unique serially-projected digital code that corresponds to, or can be correlated to, the angular offset between the source device and the endpoint device. It may be appreciated that the five discrete patterns depicted are merely one example configuration; in other cases, more than one given discrete pattern can be projected by a projection subsystem such as the projection subsystems 600, 700.

Figure 8A:
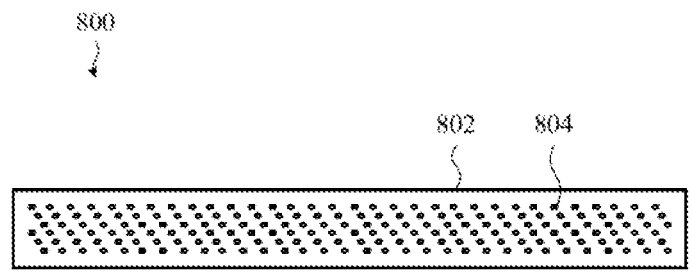
FIGS. 8A-8B depict an example construction of projection subsystem of a source device, such as described herein.
Figure 8B:
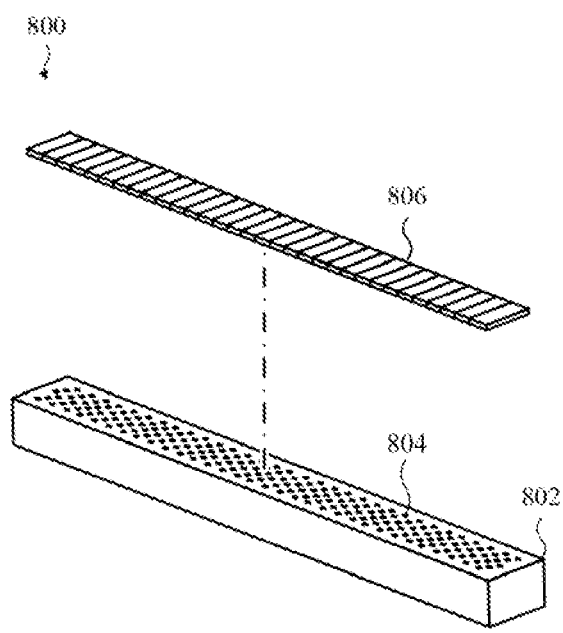

As noted above, a projection subsystem can be implemented without distributing light sources and/or light emitting regions in particular fixed patterns. For example, FIGS. 8A-8B depict a projection subsystem 800 that includes a substrate 802 with an array of laser diodes 804 formed onto or into the substrate 802. In this example, the array of laser diodes 804 can be positioned below a digital shutter 806. In many embodiments, the digital shutter 806 (see, FIG. 8B) is a liquid crystal polarization filter having an opacity that is electrically controlled.

Figure 9:
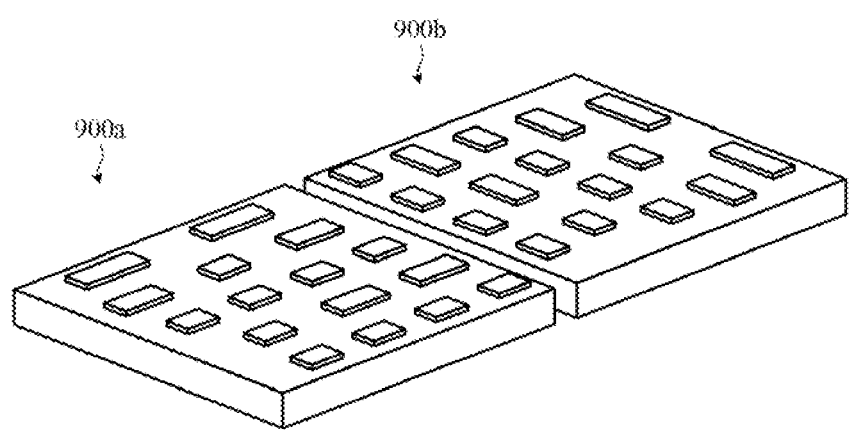
FIG. 9 depicts an example construction of a projection subsystem of a source device, such as described herein.

As described above, a projection subsystem of a source device can be configured to project a sequence of patterns configured to and/or intended to align with a particular axis or plane relative to the source device that incorporates the projection subsystem. In further embodiments, a source device can include more than one projection subsystem, aligned orthogonal to one another. FIG. 9 depicts such a system, including a first projection subsystem 900a, configured to project a sequence of patterns aligned with a first axis or plane and a second projection subsystem 900b configured to project a sequence of patterns aligned with a second axis or plane that is orthogonal to the first axis or plane. In further embodiments, more than two projection subsystems can be included, each of which may be configured to project a sequence of patterns aligned with an arbitrary axis or plane. In still further embodiments, a projection subsystem can be configured to rotate and/or translate or otherwise controllably move in order to project a sequence of patterns aligned with a particular selected axis or plane.

It may be appreciated that the foregoing description of FIGS. 5A-9, and the various alternatives thereof and variations thereto, are presented, generally, for purposes of explanation, and to facilitate a thorough understanding of various possible configurations of a projection subsystem of a source device of an optical communication system, such as described herein. However, it will be apparent to one skilled in the art that some of the specific details presented herein may not be required in order to practice a particular described embodiment, or an equivalent thereof.

Thus, it is understood that the foregoing descriptions of specific embodiments are presented for the limited purposes of illustration and description. These descriptions are not exhaustive nor intended to limit the disclosure to the precise forms recited herein. To the contrary, it will be apparent to one of ordinary skill in the art that many modifications and variations are possible in view of the above teachings.

For example, independent of the particular projection subsystem selected for a particular source device, it may be appreciated that—generally and broadly—an optical communication system, such as described herein, can be used in a number of ways to determine a position and/or an orientation of an endpoint device relative to a source device. For example, an optical communication system, such as described herein, can be used to track and/or determine the position and relative motion (e.g., speed, acceleration, pose, position, and so on) of a user moving in free space.

Figure 10A:
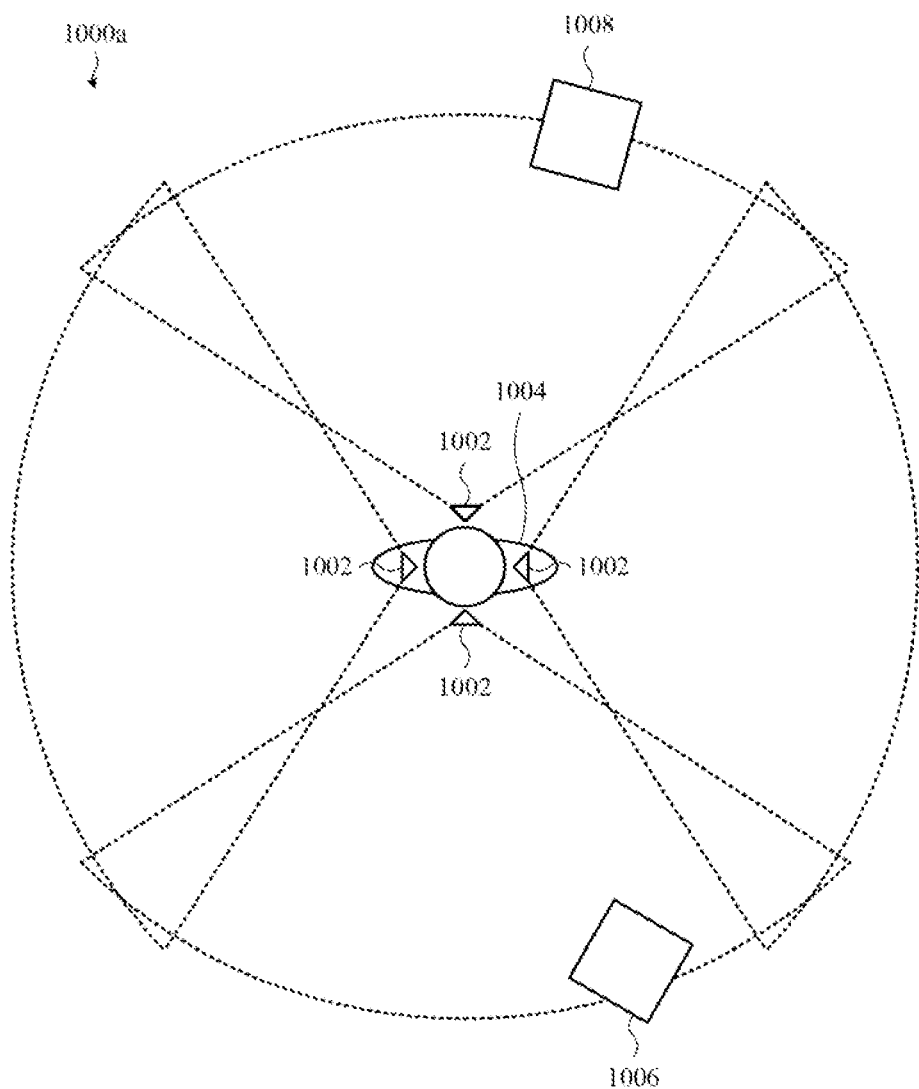
FIGS. 10A-10B depict multiple interoperating optical communication systems.

For example, FIG. 10A depicts a system 1000a in which multiple source devices and multiple endpoint devices can operate simultaneously to determine relative position and angular orientation of multiple devices in free space. More specifically, the system 1000a includes four source devices, each identified as a source device 1002, connected to and/or worn by a user 1004 that may move relative to stationary endpoint devices, such as the endpoint devices 1006, 1008. In this example, the fields of view of the source devices 1002 (illustrated with dotted lines) partially overlap, but this may not be required. To prevent interference between source devices, the source device 1002 can be configured to project each respective sequence of patterns at different times or, additionally or alternatively, using different characteristics of light (e.g., different colors, different polarization, and so on).

As a result of this construction, as the user 1004 moves relative to the stationary endpoint devices 1006, 1008, each endpoint device may receive serially-projected codes from one or more of the source devices 1002 that inform the endpoint devices of the angular offset of the endpoint devices relative to the source device that projected the code. In this manner, the position and orientation of the user 1004 in free space relative to the endpoint devices 1006, 1008 can be determined.

Figure 10B:
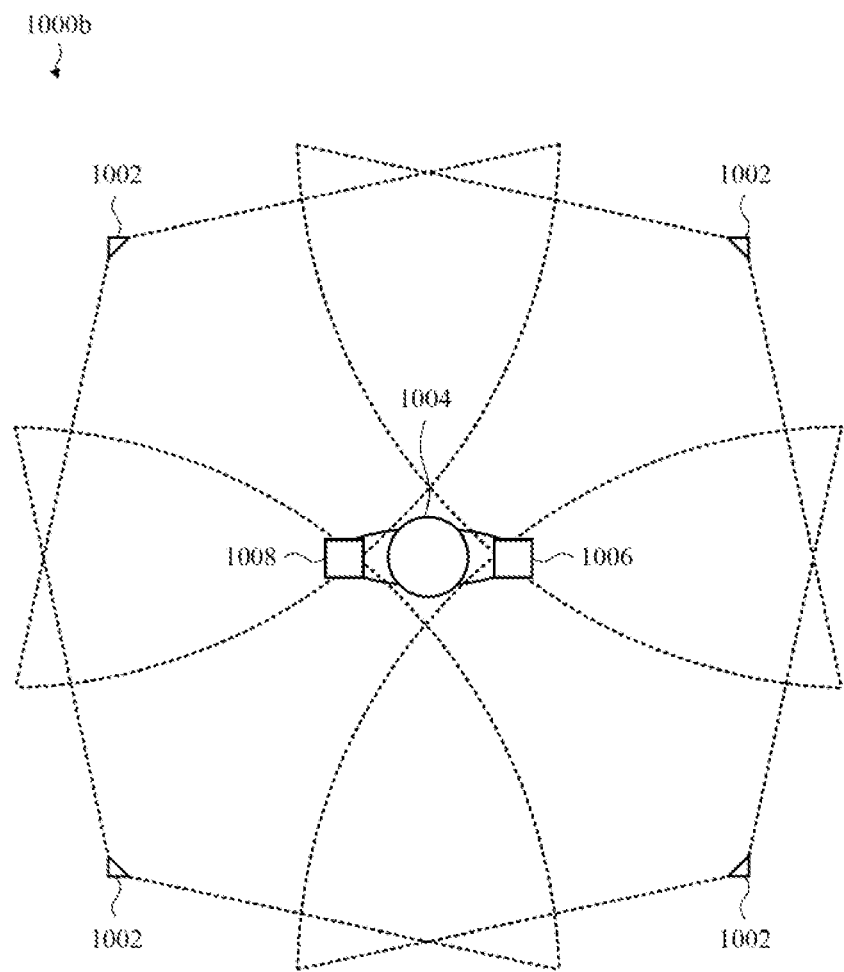

FIG. 10B depicts an alternate configuration of the system 1000a, identified as the system 1000b, in which the source devices 1002 are stationary and the endpoint devices 1006 and 1008 are connected to and/or worn by a user 1004.

It may be appreciated that the foregoing description of FIGS. 10A-10B, and the various alternatives thereof and variations thereto, are presented, generally, for purposes of explanation, and to facilitate an understanding of various possible uses of an optical communication system, such as described herein. However, it will be apparent to one skilled in the art that some of the specific details presented herein may not be required in order to practice a particular described embodiment, or an equivalent thereof.

Thus, it is understood that the foregoing descriptions of specific embodiments are presented for the limited purposes of illustration and description. These descriptions are not exhaustive nor intended to limit the disclosure to the precise forms recited herein. To the contrary, it will be apparent to one of ordinary skill in the art that many modifications and variations are possible in view of the above teachings.

For example, a source device and an endpoint device can be incorporated into any number of suitable electronic devices, whether stationary or movable, in order to determine relative position between such devices. Examples include, by are not limited to: a system in which a source device is included in goggles or glasses worn by a user in a virtual reality or augmented reality environment and an endpoint device is included into a hand-held controller to determine a real-time position and/or orientation of the controller relative to the glasses or goggles; a system in which a source device is stationary and an endpoint device is included in a portable electronic device configured to guide a user of the portable electronic device toward the source device; a system in which a source device is included in glasses worn by a user, and an endpoint device is included in a vehicle to monitor head position and gaze of the user; a system in which a source device is included in a peripheral input device (e.g., stylus, mouse, trackpad, presentation pointer, and so on) and an endpoint device is included in a second electronic device to facilitate input to an electronic device via the peripheral input device; and so on.

Further, it may be appreciated that an endpoint device can calculate, determine, or otherwise obtain position and/or angular information from serially-projected codes in a number of suitable ways. In some embodiments, as noted above, an endpoint device can include multiple discrete photosensitive elements, each configured to receive a serially-projected code from a source device. In these examples, the multiple discrete photosensitive elements can be arranged in a pattern (e.g., rectangle, square, triangle, line, and so on) having known geometric properties. In this manner and as a result of this construction, the endpoint device can accurate triangulate and/or otherwise calculate its positon in free space relative to a source device that projected the codes that were received by the multiple discrete photosensitive elements.

Generally and broadly, FIGS. 11-16 depict flow charts corresponding to example methods that may be used with a source device, and endpoint device, or a system such as described herein. It may be appreciated that these methods may not be exhaustive and/or may include additional or fewer operations.

Figure 11:
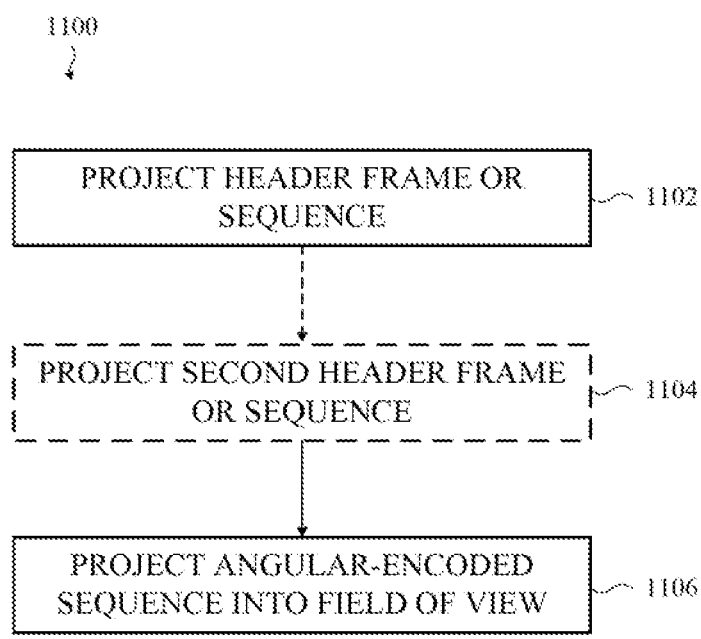
FIG. 11 is a simplified flow chart showing example steps of a method of operating a source device to project a sequence of patterns or frames toward an endpoint device of an optical communication system, such as described herein.

FIG. 11 is a simplified flow chart showing example steps of a method of operating a source device to project a sequence of patterns or frames toward an endpoint device of an optical communication system, such as described herein. The method 1100 beings at operation 1102 in which a header frame or sequence is projected by a projection subsystem of the source device. The header frame or sequence can be any suitable frame, sequence, or pattern that is recognized by an endpoint device as an indication of an upcoming projection of a sequence of patterns. Optionally, at operation 1104, a second header or frame can be projected—but this is not required. At operation 1106, the sequence of patterns or frames can be projected into the field of view of the source device.

Figure 12:
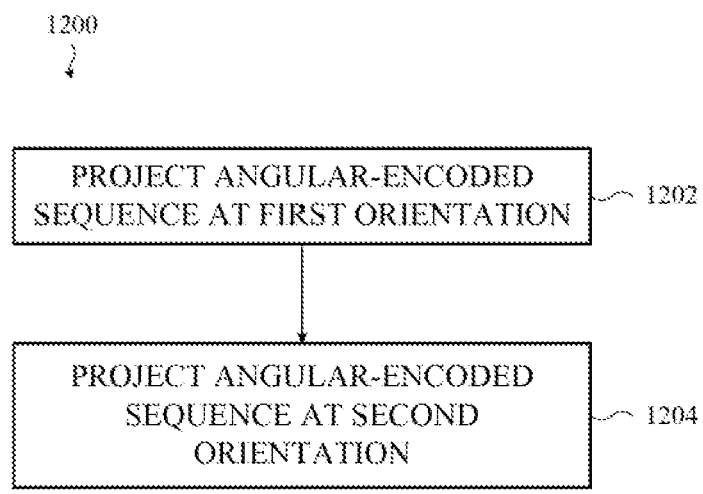
FIG. 12 is a simplified flow chart showing example steps of a method of operating a source device to project multiple orientations of illumination patterns toward an endpoint device of an optical communication system, such as described herein.

FIG. 12 is a simplified flow chart showing example steps of a method of operating a source device to project multiple orientations of illumination patterns toward an endpoint device of an optical communication system, such as described herein. The method 1200 begins at operation 1202 in which an angular-encoded sequence, such as described herein, is projected relative to a first axis and/or at a first angle (e.g., projected relative to a horizontal axis of the field of view of the source device). Next, at operation 1204, a second angular-encoded sequence, such as described herein, is projected relative to a second axis and/or a second angle (e.g., projected relative to a vertical axis of the field of view of the source device).

Figure 13:
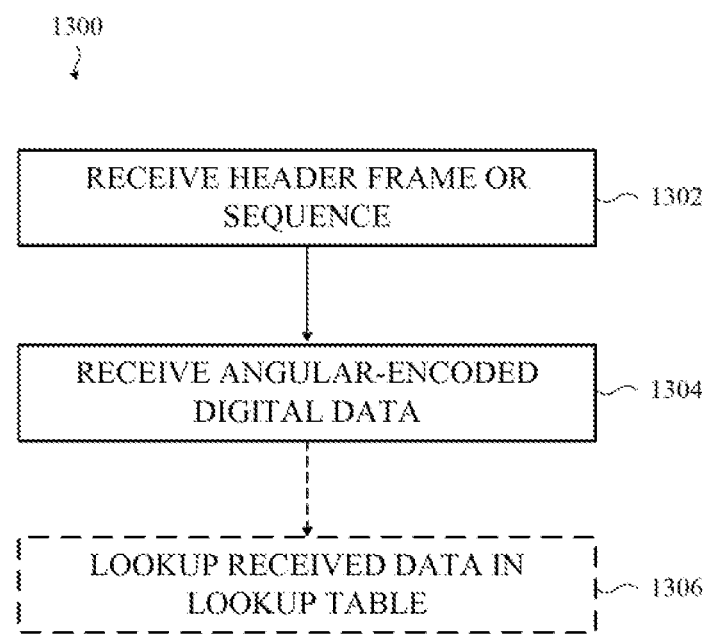
FIG. 13 is a simplified flow chart showing example steps of a method of operating an endpoint device to receive a sequence of patterns or frames projected by a source device of an optical communication system, such as described herein.

FIG. 13 is a simplified flow chart showing example steps of a method of operating an endpoint device to receive a sequence of patterns or frames projected by a source device of an optical communication system, such as described herein. The method 1300 begins at operation 1302 in which a header frame or sequence is received. Next, at operation 1304, the endpoint device receives angular-encoded digital data or, as referred to herein, a serially-projected code. Finally, at operation 1306, the angular-encoded digital data can be optionally correlated to another digital value (such as an angle of offset) by accessing a lookup table.

Figure 14:
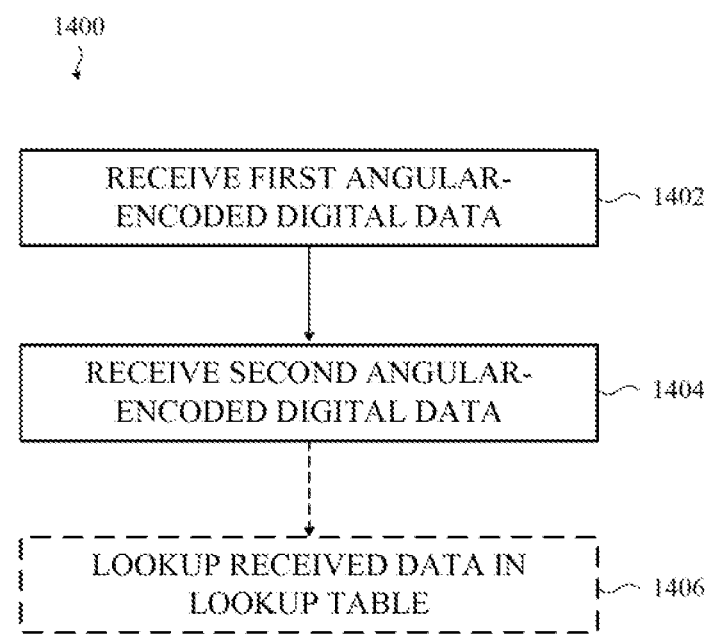
FIG. 14 is a simplified flow chart showing example steps of a method of operating an endpoint device to receive multiple orientations of illumination patterns projected by a source device of an optical communication system, such as described herein.

FIG. 14 is a simplified flow chart showing example steps of a method of operating an endpoint device to receive multiple orientations of illumination patterns projected by a source device of an optical communication system, such as described herein. The method 1400 begins at operation 1402 in which a first angular-encoded digital data is received. In some examples, the first angular-encoded digital data is received by a first photodiode or photosensitive element. At operation 1404, a second angular-encoded digital data is received. In some examples, the second angular-encoded digital data is received by a second photodiode or photosensitive element. Thereafter, optionally, at operation 1406, one or both of the angular encoded digital data values can be looked up in a lookup table to determine one or more positional or angular offset values that correspond to the codes received.

Figure 15:
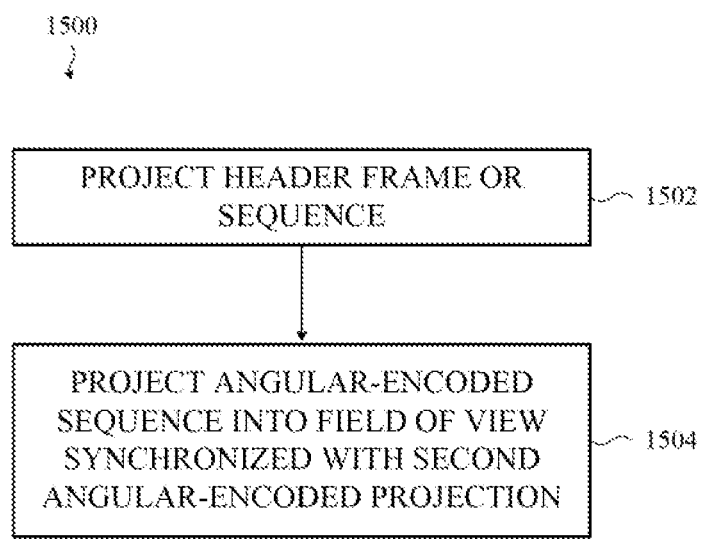
FIG. 15 is a simplified flow chart showing example steps of a method of operating multiple source devices to project multiple sequences of illumination patterns toward an endpoint device of an optical communication system, such as described herein.

FIG. 15 is a simplified flow chart showing example steps of a method of operating multiple source devices to project multiple sequences of illumination patterns toward an endpoint device of an optical communication system, such as described herein. The method 1500 begins at operation 1502 in which a header frame or sequence is projected. Next, at operation 1504, a sequence of patterns is projected in a manner that is synchronized with another sequence of patterns projected by another source device.

Figure 16:
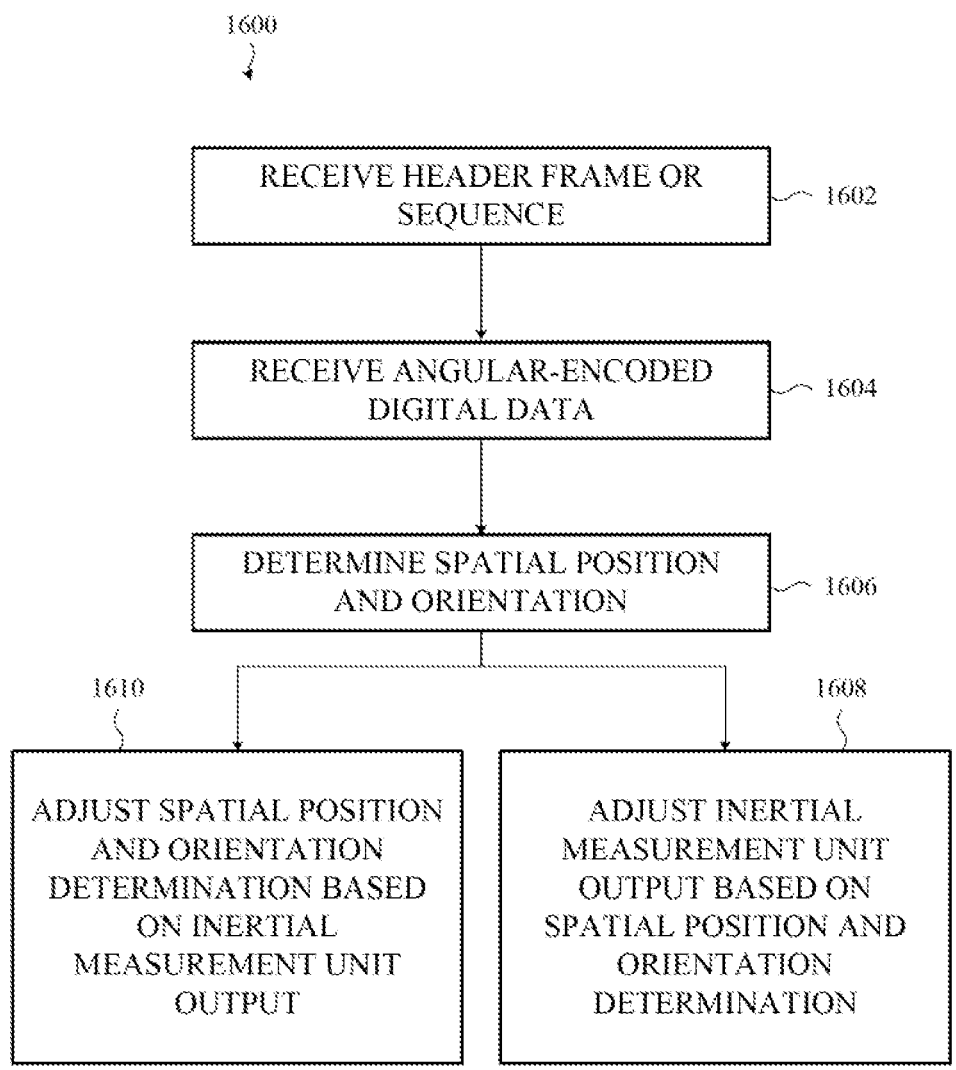
FIG. 16 is a simplified flow chart showing example steps of a method of operating an inertial measurement unit and/or localization sensor within an endpoint device configured to receive a sequence of patterns or frames projected by a source device of an optical communication system, such as described herein.

FIG. 16 is a simplified flow chart showing example steps of a method of operating an inertial measurement unit and/or localization sensor within an endpoint device configured to receive a sequence of patterns or frames projected by a source device of an optical communication system, such as described herein. The method 1600 begins at operation 1602 in which a header frame or sequence is received. Next, at operation 1604, angular-encoded data is received. Next, at operation 1606, a spatial orientation and/or position is determined based, at least in part, on the received angular-encoded data. Next, optionally, at operation 1608, an output of an inertial measurement unit (e.g., an accelerometer, a magnetometer, a gyroscope, a compass, and so on) may be adjusted based on the determined spatial orientation and/or position data. Additionally or alternatively and optionally at operation 1610, the spatial orientation and/or position data may be adjusted and/or changed based on an output of the inertial measurement unit.

One may appreciate that, although many embodiments are disclosed above, the operations and steps presented with respect to methods and techniques described herein are meant as exemplary and accordingly are not exhaustive. One may further appreciate that alternate step order or fewer or additional operations may be required or desired for particular embodiments.

Although the disclosure above is described in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but are instead defined by the claims herein presented.

What is claimed is:

1. An apparatus for projecting laser light into its field of view, the laser light encoding information distinguishing angular divisions of the field of view from one another such that an endpoint device within the field of view receives encoded information specific to the respective angular division of the field of view occupied by the endpoint device, the apparatus comprising:

a substrate;

a plurality of laser light emitting regions arranged in rows, each row defining a spatially-varying code;

an optical structure positioned over the plurality of laser light emitting regions and configured to diverge patterned laser light emitted from the plurality of laser light emitting regions at a divergence angle; and a drive circuit coupled to each row of laser light emitting regions and configured to drive each row in a sequence, there by projecting each respective spatially-varying code sequentially into the field of view such that each respective angular division of the field of view is illuminated with a unique pattern.

2. The apparatus of claim 1, wherein the sequence is encoded according to a binary encoding schema.

3. The apparatus of claim 1, wherein the sequence is encoded according to a reflected binary encoding schema.

4. The apparatus of claim 3, wherein the sequence is encoded according to a long-run reflected binary encoding schema.

5. The apparatus of claim 1, wherein the optical structure comprises a lens.

6. The apparatus of claim 1, wherein the optical structure is configured to polarize light emitted from the plurality of laser light emitting regions.

7. The apparatus of claim 1, wherein at least one laser light emitting region of the plurality of laser light emitting regions comprises a vertical-cavity surface emitting laser.

8. The apparatus of claim 1, wherein the rows are driven one at a time.

9. The apparatus of claim 1, wherein the rows are each driven for an equivalent period of time.

10. The apparatus of claim 1, wherein the rows are disposed on the substrate according to a long-run reflected binary encoding schema.

11. A method of operating an apparatus to project laser light into a field of view of the apparatus, the laser light encoding information distinguishing angular divisions of the field of view from one another such that an endpoint device within the field of view receives encoded information specific to the respective angular division of the field of view occupied by the endpoint device, the method comprising:

projecting a sequence into the field of view by:

driving a first spatially-varying row of laser light emitting regions disposed in a first pattern to emit light through an optical element configured to diverge emitted light into a first angularly-varying pattern; and driving a second spatially-varying row of laser light emitting regions disposed in a second pattern to emit light through the optical element into a second angularly-varying pattern; wherein:

the first angularly-varying pattern precedes the second angularly-varying pattern such that each angular division of the field of view is illuminated according to a time-varying pattern partly defined by the first angularly-varying pattern and partly defined by the second angularly-varying pattern.

12. The method of claim 11, wherein the first spatially-varying pattern comprises encrypted information.

13. The method of claim 11, wherein: the first spatially-varying row of laser light emitting regions is disposed on a substrate; and the second spatially-varying row of laser light emitting regions is disposed on the substrate below the first spatially-varying row.

14. The method of claim 11, further comprising projecting a header frame into the field of view prior to projecting the sequence.

15. An apparatus for projecting laser light into a field of view, the laser light encoding information distinguishing angular divisions of the field of view from one another such that an endpoint device within the field of view receives encoded information specific to the respective angular division of the field of view occupied by the endpoint device, the apparatus comprising:

a first plurality of laser light emitting regions arranged in rows, each row defining a respective unique spatially-varying code;

a second plurality of laser light emitting regions arranged in columns, each column defining a respective unique spatially-varying code;

an optical structure positioned over the first plurality and the second plurality and configured to diverge light incident to the optical structure; and a drive circuit configured to drive each row and each column in a sequence, thereby projecting each respective unique spatially-varying code sequentially into the field of view such that each respective angular division of the field of view is illuminated with a unique pattern.

16. The apparatus of claim 15, wherein the first plurality of laser light emitting regions is disposed on a substrate.

17. The apparatus of claim 16, wherein the second plurality of laser light emitting regions is disposed on the substrate.

18. The apparatus of claim 16, wherein:
the substrate is a first substrate; and
the second plurality of laser light emitting regions is disposed on a second substrate.

19. The apparatus of claim 15, wherein the optical structure comprises a lens.

* * * * *